US011070468B1

(12) United States Patent
Tripathi et al.

(10) Patent No.: US 11,070,468 B1
(45) Date of Patent: Jul. 20, 2021

(54) SERVERLESS SEGMENT ROUTING (SR)-LABEL DISTRIBUTION PROTOCOL (LDP) STITCHING

(71) Applicant: Juniper Networks, Inc., Sunnyvale, CA (US)

(72) Inventors: Vinay Kumar Tripathi, Westford, MA (US); Vishal Singh, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 62 days.

(21) Appl. No.: 16/698,724

(22) Filed: Nov. 27, 2019

(51) Int. Cl.
*H04L 12/723* (2013.01)
*H04L 12/717* (2013.01)
*H04L 12/715* (2013.01)
*H04L 12/751* (2013.01)

(52) U.S. Cl.
CPC ............ *H04L 45/507* (2013.01); *H04L 45/02* (2013.01); *H04L 45/04* (2013.01); *H04L 45/42* (2013.01)

(58) Field of Classification Search
CPC combination set(s) only.
See application file for complete search history.

(56) References Cited

U.S. PATENT DOCUMENTS

| 10,637,764 | B2 * | 4/2020 | Verma | H04L 12/4633 |
| 2008/0253367 | A1 * | 10/2008 | Ould-Brahim | H04L 45/507 370/389 |
| 2009/0168780 | A1 * | 7/2009 | Unbehagen | H04L 45/66 370/392 |
| 2010/0226382 | A1 * | 9/2010 | Kini | H04L 45/28 370/401 |
| 2014/0269698 | A1 * | 9/2014 | Filsfils | H04L 45/54 370/389 |
| 2020/0120020 | A1 * | 4/2020 | Dutta | H04L 12/66 |

OTHER PUBLICATIONS

A. Bashandy, et al., "Segment Routing interworking with LDP," *draft-ietf-spring-segment-routing-ldp-interop-15* (Internet Engineering Task Force, Sep. 2, 2018).

* cited by examiner

*Primary Examiner* — Xavier S Wong
(74) *Attorney, Agent, or Firm* — John C. Pokotylo; Pokotylo Patent Services

(57) ABSTRACT

A data forwarding device belonging to both (1) a segment routing (SR) domain and (2) a label distribution protocol (LDP) domain may be used to perform a method comprising: (a) receiving, by the data forwarding device, information uniquely associated with each of one or more nodes in the LDP domain; (b) associating, for each of the one or more nodes in the LDP domain, a unique SR segment identifier (SID) with the information uniquely associated with the node in the LDP domain, to generate one or more SR SID-to-LDP node associations; and (c) transmitting the one or more SR SID-to-LDP node associations for propagation to at least one other node in the SR domain, whereby the at least one other node in the SR domain will become aware of the one or more nodes in the LDP domain. The SR-LDP border router is aware of all the nodes in SR and LDP domain including the SRGB database (base label, node label, and label range). Once the border node is configured for LDP-SR stitching it assigns one of the free SR node SID to each LDP node. Subsequently, border node will propagate this binding to all the SR nodes (e.g., using the existing IGP TLVs). One of the available bits in label binding TLV may be set to make the nodes in the SR domain aware of the LDP nodes.

19 Claims, 19 Drawing Sheets

SERVERLESS SEGMENT ROUTING (SR)-LABEL DISTRIBUTION PROTOCOL (LDP) STITCHING

§ 1. BACKGROUND OF THE INVENTION

§ 1.1 Field of the Invention

The present description concerns communications networks. More specifically, the present description concerns enabling and simplifying interoperability in a communications network having a domain employing the label distribution protocol (LDP) and an adjacent domain employing segment routing (SR).

§ 1.2 Background Information

Although multi-protocol label switching (MPLS), LDP and SR are understood by those in the art, each is introduced here for the reader's convenience. More specifically, MPLS is introduced in § 1.2.1, LDP is introduced in § 1.2.2 and SR is introduced in § 1.2.3. Then, challenges that arise in a communications network having an LDP domain adjacent to an SR domain are discussed in § 1.2.4.

§ 1.2.1 Multi-Protocol Label Switching (MPLS)

Although multiprotocol label switching (MPLS) is well understood by those of ordinary skill in the art, it is introduced here for the reader's convenience. MPLS is a method for engineering traffic patterns by assigning short labels to network packets that describe how to forward them through the network. MPLS is independent of routing tables or any routing protocol and can be used for unicast packets. More specifically, in a traditional Internet protocol (IP) network, packets are transmitted with an IP header that includes a source and destination address. When a router receives such a packet, it examines its forwarding tables for the next-hop address associated with the packet's destination address and forwards the packet to the next-hop location. On the other hand, in an MPLS network, each packet is encapsulated with an MPLS header. When a router receives the packet, it copies the header as an index into a separate MPLS forwarding table. Each entry in the MPLS forwarding table includes forwarding information that the router uses to forward the traffic and modify, when necessary, the MPLS header. Since the MPLS forwarding table has far fewer entries than the more general forwarding table, the lookup consumes less processing time and processing power. The resultant savings in time and processing are a significant benefit for traffic that uses the network to transit between outside destinations only.

Label-switched paths (LSPs) are unidirectional routes through a network or autonomous system (AS). In normal IP routing, the packet has no predetermined path. Instead, each router forwards a packet to the next-hop address stored in its forwarding table, based only on the packet's destination address. Each subsequent router then forwards the packet using its own forwarding table. In contrast, MPLS routers (within an AS) determine paths through a network through the exchange of MPLS traffic engineering information. Using these paths, the routers direct traffic through the network along an established route. Rather than selecting the next hop along the path as in IP routing, each router is responsible for forwarding the packet to a predetermined next-hop address.

Routers that are part of the LSP are referred to label-switching routers (LSRs). Each LSR must be configured with MPLS so that it can interpret MPLS headers and perform the MPLS operations required to pass traffic through the network. An LSP can include four types of LSRs. First, an ingress or inbound LSR provides the entry point for traffic into MPLS. Native IPv4 packets are encapsulated into the MPLS protocol by the ingress router. Each LSP can have only one ingress router. Second, a transit LSR is any router in the middle of an LSP. Transit LSRs forward MPLS traffic along the LSP, using only the MPLS header to determine how the packet is routed. Third, the penultimate LSR is the second-to-last router in the LSP. If penultimate hop popping (PHP) is employed, the penultimate LSR is responsible for stripping the MPLS header from the packet before forwarding it to the outbound router. Fourth, the egress or outbound LSR is the endpoint for the LSP. The egress router receives MPLS packets from the penultimate LSR and performs an IP route lookup. The egress router then forwards the packet to the next hop of the route. Each LSP can have only one outbound router.

To forward traffic through an MPLS network, MPLS routers encapsulate packets and assign and manage headers known as labels. A label is a 20-bit unsigned integer in the range 0 through 1,048,575. The routers use the labels to index the MPLS forwarding tables that determine how packets are routed through the network. When a network's inbound router receives traffic, it inserts an MPLS label between the IP packet and the appropriate Layer 2 header for the physical link. The label contains an index value that identifies a next-hop address for the particular LSP. When the next-hop transit router receives the packet, it uses the index in the MPLS label to determine the next-hop address for the packet and forwards the packet to the next router in the LSP. As each packet travels through the transit network, every router along the way performs a lookup on the MPLS label and forwards the packet accordingly. When the egress router receives a packet, it examines the header to determine that it is the final router in the LSP. The egress router then removes the MPLS header, performs a regular IP route lookup, and forwards the packet with its IP header to the next-hop address.

LSRs can perform five label operations, First, a "push" operation adds a new label to the top of the packet. For IPv4 packets arriving at the inbound router, the new label is the first label in the label stack. For MPLS packets with an existing label, this operation adds a label to the stack and sets the stacking bit to 0, indicating that more MPLS labels follow the first. When the ingress router receives the packet, it performs an IP route lookup on the packet. Because the route lookup yields an LSP next hop, the ingress router performs a label push on the packet, and then forwards the packet to the LSP next hop. Second, a "swap" (or switch) operation replaces the label at the top of the label stack with a new label. When a transit router receives the packet, it performs an MPLS forwarding table lookup. The lookup yields the LSP next hop and the path index of the link between the transit router and the next router in the LSP. Third, a "pop" operation removes the label from the top of the label stack. For IPv4 packets arriving at the penultimate router, the entire MPLS label is removed from the label stack. For MPLS packets with an existing label, this operation removes the top label from the label stack and modifies the stacking bit as necessary (e.g., sets it to 1 if only a single label remains in the stack). If multiple LSPs terminate at the same outbound router, the router performs MPLS label operations for all outbound traffic on the LSPs. To share the operations among multiple routers, most LSPs use penultimate hop popping (PHP). Fourth, a "multiple push" operation adds multiple labels to the top of the label stack. This action is equivalent to performing multiple push operations. Finally, a "swap and push" operation replaces the top label with a new label and then pushes a new label to the top of the stack.

An MPLS LSP may be established either (A) statically (e.g., via manual configuration), or (B) dynamically (e.g., using a protocol such as the label distribution protocol (LDP) or the resource reservation protocol (RSVP)). Like a static route, a static LSP requires each router along the path to be configured explicitly. A network administrator must manually configure the path and its associated label values. Static LSPs require less processing by the LSRs because no signaling protocol is used. However, because paths are statically configured, they cannot adapt to network conditions. Dynamic LSPs use signaling protocols to establish themselves and propagate LSP information to other LSRs in the network. A network administrator configures the inbound router with LSP information that is transmitted throughout the network when they enable the signaling protocols across the LSRs. Because the LSRs must exchange and process signaling packets and instructions, dynamic LSPs consume more resources than static LSPs. However, dynamic LSPs can avoid the network problems by detecting topology changes and outages and propagating them throughout the network.

FIG. 1 illustrates an example of an LSP between ingress router R1 (PE1) and egress router R5 (PE2). Typically, when MPLS is deployed, penultimate hop popping ("PHP") is used instead of ultimate hop popping ("UHP"). Router CE1 forwards an Internet Protocol (IP) packet to its next hop (R1), which is also the LSP ingress (or headend). R1 checks prefix 5.5.5.5 (destination loopback) against the following information stored in its forwarding table:

```
enugadi@Enugadi# run show route 5.5.5.5
inet.0: 16 destinations, 17 routes (15 active, 0 holddown, 1 hidden)
+ = Active Route, - = Last Active, * = Both
5.5.5.5/32        *[Static/5] 01:33:28
                  > to 10.0.0.2 via ge-0/0/0.10, Push 1000002
                  [OSPF/10] 01:01:42, metric 5
                  > to 10.0.0.2 via ge-0/0/0.10
```

R1 pushes label L1 (L1-1000002) on the packet and forwards the labeled packet (L1+IP) to router R2. R2 checks input label 1000002 against the following information stored in its MPLS forwarding table:

```
enugadi@Enugadi# run show route table mpls.0
label 1000002 logical-router r2
mpls.0: 6 destinations, 6 routes (6 active, 0 holddown, 0 hidden)
+ = Active Route, - = Last Active, * = Both
1000002           *[Static/5] 00:45:22
                  > to 10.0.0.6 via ge-0/1/0.10, Swap 1000003
```

As a result, R2 completes the standard MPLS label swapping operation, swapping label L1 for label L2 (L2-10000003), and forwards the labeled packet (L2+IP) to router R3. R3 checks the input label 10000003 against the following information stored in its MPLS forwarding table:

```
enugadi@Enugadi# run show route table mpls.0
label 1000003 logical-router r3
mpls.0: 5 destinations, 5 routes (5 active, 0 holddown, 0 hidden)
+ = Active Route, - = Last Active, * = Both
1000003           *[Static/5] 00:50:03
                  > to 10.0.0.10 via ge-0/0/0.11, Swap 1000004
```

As a result, R3 completes the standard MPLS label swapping operation, swapping label L2 for label L3 (L3-10000004), and forwards the labeled packet (L3+IP) to router R4. R4 checks the input label 10000004 against the following information stored in its MPLS forwarding table:

```
enugadi@Enugadi# run show route table mpls.0
label 1000004 logical-router r4
mpls.0: 6 destinations, 6 routes (6 active, 0 holddown, 0 hidden)
+ = Active Route, - = Last Active, * = Both
1000004           *[Static/5] 01:24:54
                  > to 10.0.0.14 via ge-0/0/0.11, Swap 0
1000004(S=0)      *[Static/5] 01:24:54
                  > to 10.0.0.14 via ge-0/0/0.11, Pop
```

Since R4 is the penultimate-hop router for the LSP to router R5 (PE2), it first pops the label L3 and then forwards the packet (e.g., with label 0, not shown) to router R5. When R5 receives the packet, it can have a service label, an explicit-null label, or just be a plain IP or VPLS packet. R5 then forwards the unlabeled packet to router CE2.

In summary, with the static LSP, R1 reaches R5 through MPLS labeling which is indicated by traceroute result below:

enugadi@Enugadi# run traceroute 5.5.5.5
traceroute to 5.5.5.5 (5.5.5.5), 30 hops max, 40 byte packets
 1  10.0.0.2 (10.0.0.2)  0.172 ms  0.118 ms  0.109 ms
    MPLS Label=1000002 CoS=0 TTL=1 S=1
 2  10.0.0.6 (10.0.0.6)  0.204 ms  0.194 ms  0.192 ms
    MPLS Label=1000003 CoS=0 TTL=1 S=1
 3  10.0.0.10 (10.0.0.10)  0.288 ms  0.283 ms  0.280 ms
    MPLS Label=1000004 CoS=0 TTL=1 S=1
 4  5.5.5.5 (5.5.5.5)  0.336 ms  0.332 ms  0.336 ms § 1.2.2 Label Distribution Protocol (LDP)

A fundamental concept in MPLS is that two Label Switching Routers (LSRs) must agree on the meaning of the labels used to forward traffic between and through them. MPLS defines a label distribution protocol as a set of procedures by which one Label Switched Router (LSR) informs another of the meaning of labels used to forward traffic between and through them. MPLS does not assume a single label distribution protocol. That is, a label distribution protocol defines a set of procedures by which one LSR informs another of label bindings it has made. The document, L. Andersson, et al., "LDP Specification," *Request for Comments* 5036 (Internet Engineering Task Force, October 2007 (referred to as "RFC 5036" and incorporated herein by reference) defines a set of such procedures called LDP (for Label Distribution Protocol) by which LSRs distribute labels to support MPLS forwarding along normally routed paths. Generally, LDP is used for distributing labels in non-traffic-engineered applications.

LDP allows routers to establish label-switched paths (LSPs) through a network by mapping network-layer routing information directly to data link layer-switched paths. LDP associates a forwarding equivalence class (FEC) with each LSP it creates. The FEC associated with an LSP specifies which packets are mapped to that LSP. LSPs are extended through a network as each router chooses the label advertised by the next hop for the FEC and splices it to the label it advertises to all other routers. This process forms a tree of LSPs that converge on the egress router.

LDP runs on a device configured for MPLS support. The successful configuration of both MPLS and LDP initiates the exchange of TCP packets across the LDP interfaces. The packets establish TCP-based LDP sessions for the exchange of MPLS information within the network. (Two LSRs that use LDP to exchange label/FEC mapping information are known as "LDP Peers" with respect to that information, and there is an "LDP Session" between them.) A single LDP session allows each peer to learn the other's label mappings. That is, the protocol is bidirectional. Thus, LDP is a simple, fast-acting signaling protocol that automatically establishes LSP adjacencies within an MPLS network. Routers then share LSP updates such as hello packets and LSP advertisements across the adjacencies. After the adjacent LSRs establish the LDP session, they can maintain, and terminate, the session by exchanging messages. LDP advertisement messages allow LSRs to exchange label information to determine the next hops within a particular LSP. Any topology changes, such as a router failure, generate LDP notifications that can terminate the LDP session or generate additional LDP advertisements to propagate an LSP change.

There are four categories of LDP messages: (1) discovery messages, used to announce and maintain the presence of an LSR in a network; (2) session messages, used to establish, maintain, and terminate sessions between LDP peers; (3) advertisement messages, used to create, change, and delete label mappings for FECs; and (4) notification messages, used to provide advisory information and to signal error information.

When to request a label or advertise a label mapping to a peer is largely a local decision made by an LSR. In general, the LSR requests a label mapping from a neighboring LSR when it needs one, and advertises a label mapping to a neighboring LSR when it wishes the neighbor to use a label.

LDP runs on top of an interior gateway protocol (IGP) such as intermediate system-intermediate system (IS-IS) or open shortest path first (OSPF).

§ 1.2.3 Segment Routing (SR)

Segment routing (also referred to as Source Packet Routing in Networking ("SPRING")) is a control-plane architecture that enables an ingress router to steer a packet through a specific set of nodes and links in the network without relying on the intermediate nodes in the network to determine the actual path it should take. In this context, the term "source" means the point at which the explicit route is imposed. Segment routing is defined in "Segment Routing Architecture," *Request for Comments* 8402 (July 2018, the Internet Engineering Task Force) (referred to as "RFC 8402" and incorporated herein by reference). SPRING enables automation of a network by using a software-defined network ("SDN") controller for traffic steering and traffic engineering in a wide area network ("WAN") packet network.

Segment routing leverages the source routing paradigm. A node steers a packet through an ordered list of instructions, called "segments." For example, an ingress router (also referred to as "a headend router") can steer a packet through a desired set of nodes and links by prepending the packet with segments that contain an appropriate combination of tunnels.

§ 1.2.3.1 SR Domain

An SR domain is a collection of nodes that participate in SR protocols. Within an SR domain, a node can execute ingress, transit, or egress procedures. FIG. 2 depicts a network in which a source node sends a packet to a destination node. The source and destination nodes reside outside of the SR domain, but the path between them traverses the SR domain. More specifically, when the packet arrives at the SR ingress node (R1), the ingress node subjects the packet to policy. Policy can associate a packet with an SR path. Policy includes match conditions and actions. If the packet satisfies match conditions, the SR ingress node (R1) can encapsulate the packet in an SR tunnel. The SR tunnel traverses an SR path to the egress node (R6).

The SR path can be engineered to satisfy any number of constraints (e.g., minimum link bandwidth, maximum path latency). While an SR path can follow the least cost path to the egress node, constraints can cause it to follow another path.

The source node and the SR ingress node may reside on independent hardware platforms (e.g., on a laptop and a router, respectively), or the source node and SR ingress node can reside on the same hardware (e.g., on a virtual machine and a hypervisor, respectively). Similarly, the SR egress node and the destination node can reside on independent hardware platforms, or on a single platform. In a less typical configuration, the source node resides within the SR domain. In this case, the source node is also the SR ingress node, because it executes SR ingress procedures Similarly, the destination node can reside within the SR domain, in which case, the destination node is also the SR egress node, because it executes SR egress procedures.

§ 1.2.3.2 SR Path

An SR path is an ordered list of segments that connects an SR ingress node to an SR egress node. Although an SR path can follow the least cost path from ingress to egress, it can also follow another path.

Different SR paths can share the same segment. For example, referring to FIG. 3, Path A connects ingress node A to egress node Z, while Path B connects ingress node B to the same egress node Z. Both paths A and B traverse Segment 3.

When an SR ingress node encapsulates a packet in an SR tunnel, it encodes the associated segment list in the tunnel header. It then forwards the packet downstream. Transit nodes process the tunnel header, forwarding the packet from the current segment to the next segment. Since the SR ingress node encodes path information in the tunnel header, transit nodes do not need to maintain information regarding each path that they support. Rather, the transit nodes are only required to process the tunnel header, forwarding the packet from the current segment to the next segment. This is a major benefit of SR. More specifically, since transit nodes are not required to maintain path information, overhead associated with maintaining that information is eliminated, routing protocols are simplified, scaling characteristics are improved, and network operations become less problematic.

§ 1.2.3.3 SR Segments and Segment Types

An SR segment is an instruction that causes a packet to traverse a section of the network topology. While a segment (i.e., an instruction) causes a packet to traverse a section of the network topology, it is distinct from that section of the network topology. SR defines many different SR segment types. Among these are the "adjacency segments" and "prefix segments." Each of these types of segments is described below.

An adjacency segment is an instruction that causes a packet to traverse a specified link (i.e., a link that is associated with an IGP adjacency). FIG. 4 depicts an SR path that connects ingress node R1 to egress node R6. The path contains the following adjacency segments: (1) segment 1, instantiated on R1, causes packets to traverse link R1→R2; (2) segment 2, instantiated on R2, causes packets to traverse link R2→R3; and segment 3, instantiated on R3, causes packets to traverse link R3→R6. If any of the above-mentioned links becomes unavailable, so does the associated adjacency segment. Consequently, if any of the above-mentioned adjacency segments becomes unavailable, so does the entire path.

Thus, an adjacency segment is a strict forwarded single-hop tunnel that carries packets over a specific link between two nodes, irrespective of the link cost.

A prefix segment is an instruction that causes a packet to traverse the least cost path (or a path determined using an identified algorithm) to a node or prefix. Referring to FIG. 5A, assume that all links are configured with the same interior gateway protocol (IGP) metric and that the SR path is to be a least cost (and therefore) shortest path. An SR path connects ingress node R1 to egress node R6 and contains the following prefix segments: (1) segment 1, instantiated on R1, causes packets to traverse the least cost path from R1 to R2; (2) segment 2, instantiated on R2 and R3, causes packets to traverse the least cost path from the instantiating node to R6. Consequently, when the links are all available, the SR path guides packets through the above-mentioned links and segments.

Referring to FIG. 5B, assume that the link R1→R2 becomes unavailable. When this occurs, the network establishes a new least cost path between R1 and R2. This new least cost path includes Links R1→R4, and R4→R2. Since the network has established a new least cost path between R1 and R2, segment 1 remains available and causes packets to traverse the new least cost path. The behavior of segment 2 is unchanged. Therefore, the path now traverses Links R1→R4, R4→R2, R2→R3 and R3→R6.

Thus, a prefix segment is a multihop tunnel that uses equal cost multi-hop aware shortest path links to reach a prefix. A prefix segment identifier (SID) supports both IPv4 and IPv6 prefixes. A node segment is a special case of prefix segment that uses shortest path links between two specific nodes.

§ 1.2.3.4 SR Multi-Protocol Label Switching (MPLS)

In SR-MPLS, SR paths are encoded as MPLS label stacks, with each label stack entry representing a segment in the SR path. The following describes how MPLS labels are used to encode adjacency and prefix segments.

Referring to FIG. 6, an SR path connects R1 to R4. The SR path contains three adjacency segments. Segment 1 causes packets to traverse link R1→R2, segment 2 causes packets to traverse link R2→R3, and segment 3 causes packets to traverse link R3→R4. When R1 receives a packet from outside of the SR domain, it subjects the packet to policy. Policy may cause R1 to forward the packet through the SR path shown in FIG. 6. When this occurs, R1 imposes an MPLS label stack containing two entries. The entry at the top of the stack represents segment 2 and carries MPLS label 1002. The entry at the bottom of the stack represents segment 3 and carries MPLS label 1003.

Having imposed an MPLS label stack, R1 forwards the encapsulated packet through segment 1 (i.e., Link R1→R2). When the packet arrives at R2, R2 extracts the top label (i.e., 1002) from the label stack and searches for a corresponding entry in its Forwarding Information Base ("FIB"). The corresponding FIB entry includes an instruction (i.e., POP) and a next-hop (i.e., R3). Therefore, R2 pops the topmost label from the label stack and forwards the packet through segment 2 (i.e., Link R2→R3).

When the packet arrives at R3, R3 extracts the label (i.e., 1003) from the remaining label stack and searches for a corresponding entry in its FIB. The corresponding FIB entry includes an instruction (i.e., POP) and a next-hop (i.e., R4). Therefore, R3 pops the remaining entry from the label stack and forwards the packet through segment 3 (i.e., Link R3→R4). As shown in FIG. 6, after traversing the SR path, the packet arrives at R4 without MPLS encapsulation.

In FIG. 7, an SR path connects R1 to R7 via R4. The SR path contains two prefix segments. Segment 1 is a prefix segment that causes packets to traverse the (e.g., least cost) path from R1 to R4. Segment 2 is a prefix segment that causes packets to traverse the (e.g., least cost) path from R4 to R7. In this network, assume that all links are configured with the same IGP metric (e.g., 10). Therefore, the least cost path for the first segment from R1 to R4 traverses links R1→R2, R2→R3 and R3→R4, while the least cost path for the second segment from R4 to R7 traverses links R4→R8 and R8→R7.

When R1 receives a packet from outside of the SR domain, it subjects the packet to policy. Policy may cause R1 to forward the packet through the SR path shown in FIG. 7. When this occurs, R1 imposes an MPLS label stack containing two entries. The top entry of the label stack represents segment 1 and carries the label 2001. The bottom entry of the label stack represents segment 2 and carries the label 2002. Having imposed an MPLS label stack, R1 forwards the encapsulated packet into segment 1 via link R1→R2.

When the packet arrives at R2, R2 extracts the top label (i.e., 2001) from the label stack and searches for a corresponding entry in its FIB. The corresponding FIB entry includes an instruction (i.e., SWAP—3001) and a next-hop (i.e., R3). Therefore, R2 overwrites the topmost label with a new value (i.e., 3001) and forwards the packet to R3.

When the packet arrives at R3, R3 extracts the top label (i.e., 3001) from the label stack and searches for a corresponding entry in its FIB. The corresponding FIB entry includes an instruction (i.e., POP) and a next-hop (i.e., R4). Therefore, R3 pops the topmost entry from the label stack and forwards the packet into segment 2 via link R3-→R4.

When the packet arrives at R4, R4 extracts the remaining label (i.e., 2002) from the label stack and searches for a corresponding entry in its FIB. The corresponding FIB entry includes an instruction (i.e., SWAP—3002) and a next-hop (i.e., R8). Therefore, R4 overwrites the remaining label with a new value (i.e., 3002) and forwards the packet to R8.

When the packet arrives at R8, R8 extracts the remaining label (i.e., 3002) from the label stack and searches for a corresponding entry in its FIB. The corresponding FIB entry includes an instruction (i.e., POP) and a next-hop (i.e., R7). Therefore, R8 pops the remaining entry from the label stack and forwards the packet to R7 without MPLS encapsulation.

§ 1.2.3.4.1 Penultimate Hop Popping (PHP) and the Explicit Null Label

In the examples above, each segment executes PHP procedures. That is, when a packet traverses a segment, the segment's penultimate node pops the label associated with the segment. If the SR path contains another segment, yet to be traversed, the current segment's egress node is also the ingress node of the next segment. In this case, the packet arrives at that node with the next segment's label exposed on the top of the stack. If the SR path does not contain another segment, yet to be traversed, the segment egress node is also the path egress node. In that case, the packet arrives at the path egress node without MPLS encapsulation.

In some cases, the final link in the SR path may not be able to carry the packet without MPLS encapsulation. For example, the packet may be IPv6, while the link supports IPv4 only. In order to prevent this problem, the SR ingress node can add an MPLS Explicit Null label to the top of the MPLS label stack.

When the penultimate node in the final segment pops the label associated with the final segment, it exposes the Explicit Null label. It then forwards the packet to the path egress node. The path egress node pops the Explicit Null label and continues to process the packet.

§ 1.2.3.5 Configuration and Distribution of Segment Identifiers (SIDs)

The foregoing examples described with respect to FIGS. 6 and 7 assumed that MPLS labels were distributed and each node's FIB was populated. Essentially segment routing engages interior gateway protocols ("IGPs") like Intermediate-System Intermediate-System ("IS-IS") and open shortest path first ("OSPF") for advertising two types of network segments or tunnels—(1) a strict forwarded single-hop tunnel that carries packets over a specific link between two nodes, irrespective of the link cost (referred to as "adjacency segments," which were described in § 1.2.3.3 above), and (2) a multihop tunnel using shortest path links between two specific nodes (referred to as "node segments," which were described in § 1.2.3.3 above).

Each segment is associated with an identifier, which is referred to as the segment identifier ("SID"). As already noted above, an ordered list of segments is encoded as a stack of labels. A segment can represent any instruction, topological or service-based. A segment can have a local semantic to a segment routing node or to a global node within a segment routing domain. Segment routing enforces a flow through any topological path and service chain while maintaining per-flow state only at the ingress node to the segment routing domain. Segment routing can be directly applied to the MPLS architecture with no change on the forwarding plane. A segment is encoded as an MPLS label. An ordered list of segments is encoded as a "stack" of labels or "label stack." The segment to be processed is on the top of the stack (i.e., the outermost label of the label stack). Upon completion of a segment, the related label is "popped" (i.e., removed) from the stack.

§ 1.2.4 Challenges in a Communications Network Having an LDP Domain Adjacent to an SR Domain SR is becoming favoured over LDP. Some believe this is because SR eliminates the need for additional signalling and label distribution protocols (such as LDP) since SR leverages the routing protocol itself (IGP, BGP) for label distribution. SR label distribution in the IGP and LDP label distribution are similar in that they are easy to configure (labels are automatically advertised among LSRs when an adjacency peering is formed, and LSPs need not be configured manually). Further, both LDP and SR form stateless multipoint-to-point LSPs derived automatically for each node. However, in SR, nodes and prefixes have globally unique labels assigned throughout the domain, whereas in LDP, these labels are locally significant, assigned a unique value at every hop. Some believe that SR's use of global labels should reduce data plane state at every network hop. In contrast, some implementations using LDP can create unnecessary control and data plane state, which may lead to scaling challenges. Furthermore, SR also enables traffic engineering capabilities and has support for IPv6 address families derived inherently from the routing protocol.

In view of the foregoing, there has been a migration from LDP to SR in communications network. However, some communications networks still use both LDP and SR. Such communications networks need to enable routers in an LDP domain to interoperation with routers in an SR domain. The document, A. Bashandy, et al., "Segment Routing interworking with LDP," *draft-ietf-spring-segment-routing-ldp-interop*-15 (Internet Engineering Task Force, Sep. 2, 2018) (incorporated herein by reference) describes how SR operations in a network in which LDP is deployed, and in which SR-capable and non-SR-capable nodes coexist. FIG. 8 illustrates such an example network topology including an SR domain (including routers R1, R2, R3 and R5) and an LDP domain (including routers R5, R6 and R7). In this example, R5 is a border router with SR-LDP stitching enabled. The loopback interface Io0 of R5 is leaked into both the SR and LDP domains. On the left side of R5, interfaces ET-0/0/1 and ET-0/0/2 are ISIS-SR enabled, and on the right side of R5, interfaces ET-0/0/3 and ET-0/0/4 are LDP and ISIS enabled. R3 includes a segment routing mapping server (SRMS) which (1) maps LDP loopback IP addresses to SR labels, and (2) propagates these SR labels (as well as other SR labels) in the SR domain.

Unfortunately, an arrangement such as the one illustrated in FIG. 8 requires an LDP Mapping Server in order to provide interoperability of routers in the SR domain with routers in the LDP domain. That is, in current implementations requiring SR-LDP interoperability, one of the SR nodes is configured as mapping sever on which a node SID is statically assigned for each node in the LDP domain. However, this raises the following problems and challenges. First, it requires static label mapping configuration on a dedicated router which acts as an LDP mapping server. Such, manual, static, configuration is prone to human error which can cause routing problems. Further, it is not a scalable solution in the large networks. Finally, changes in the LDP domain require corresponding changes in the mapping server in the SR domain. Therefore, it would be useful to provide SR-LDP interoperability without needing an SR mapping server.

§ 2. SUMMARY OF THE INVENTION

The challenge of providing SR-LDP interoperability without needing an SR mapping server is solved by assigning node SIDs in a dynamic manner on an SR-LDP border router. The SR-LDP border router is aware of all the nodes in SR and LDP domain including the SRGB database (base label, node label, and label range). Once the border node is configured for LDP-SR stitching, it will assign one of the free SR node SID to each LDP node. Subsequently, the border router may propagate this binding to all the SR nodes using the existing IGP TLVs. One of the available bits in label binding TLV may be set to make the nodes in SR domain aware of the LDP nodes.

A data forwarding device belonging to both (1) a segment routing (SR) domain and (2) a label distribution protocol (LDP) domain may be used to perform a method comprising: (a) receiving, by the data forwarding device, information uniquely associated with each of one or more nodes in the LDP domain; (b) associating, for each of the one or more nodes in the LDP domain, a unique SR segment identifier (SID) with the information uniquely associated with the node in the LDP domain, to generate one or more SR SID-to-LDP node associations; and (c) transmitting the one or more SR SID-to-LDP node associations for propagation to at least one other node in the SR domain, whereby the at least one other node in the SR domain will become aware of the one or more nodes in the LDP domain.

In at least some example methods, the at least one other node in the SR domain does not belong to the LDP domain. In at least some example methods, the one or more nodes in the LDP domain do not belong to the SR domain.

In at least some example methods, the information uniquely associated with each of one or more nodes in the LDP domain is received by the data forwarding device via an interior gateway protocol (IGP) and LDP. For example, the IGP may be one of (A) an open shortest path first (OSPF) protocol, or (B) an intermediate system-intermediate system (IS-IS) protocol.

In at least some example methods, the information uniquely associated with each of one or more nodes in the LDP domain received by the data forwarding device includes an LDP label associated with the node in the LDP domain. In at least some example methods, the information uniquely associated with each of one or more nodes in the LDP domain received by the data forwarding device includes a loopback internet protocol (IP) address of the node in the LDP domain.

In at least some example methods, the act of associating, for each of the one or more nodes in the LDP domain, a unique SR segment identifier (SID) with the information uniquely associated with the node in the LDP domain, generates one or more SR SID-to-LDP IP loopback address bindings.

In at least some example methods, the act of transmitting the one or more SR SID-to-LDP node associations for propagation to at least one other node in the SR domain, whereby the at least one other node in the SR domain will become aware of the one or more nodes in the LDP domain, is performed using an interior gateway protocol (IGP) message carrying a type, length, value (TLV) or TLV binding. The TLV or TLV binding may further encode that the LDP node is in an LDP domain outside of the SR domain.

These example methods will advantageously eliminate the need of a statically configuring mapping server and updating the server configuration upon every change in the LDP domain.

§ 3. BRIEF DESCRIPTION OF THE DRAWINGS

Figure 1:
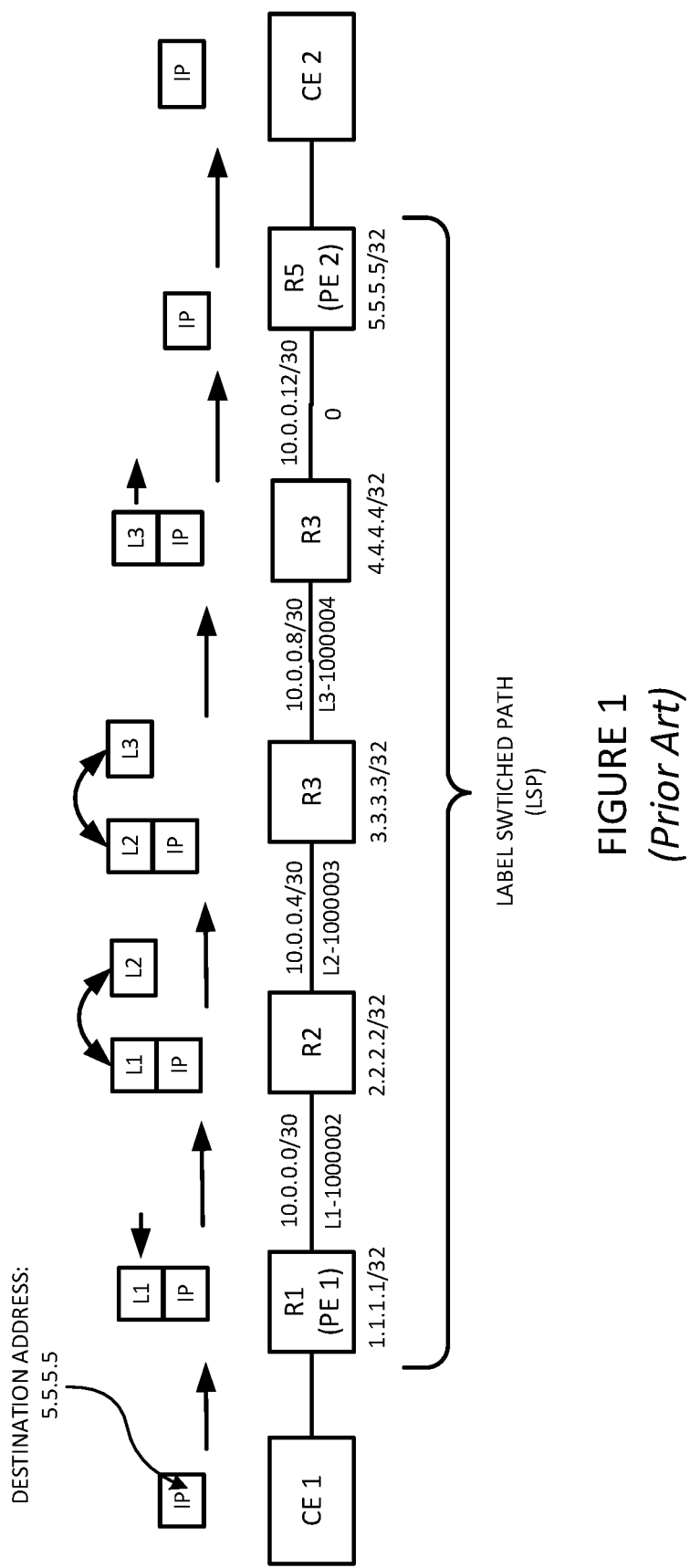
FIG. 1 illustrates a label switched path (LSP") between two routers.
Figure 2:
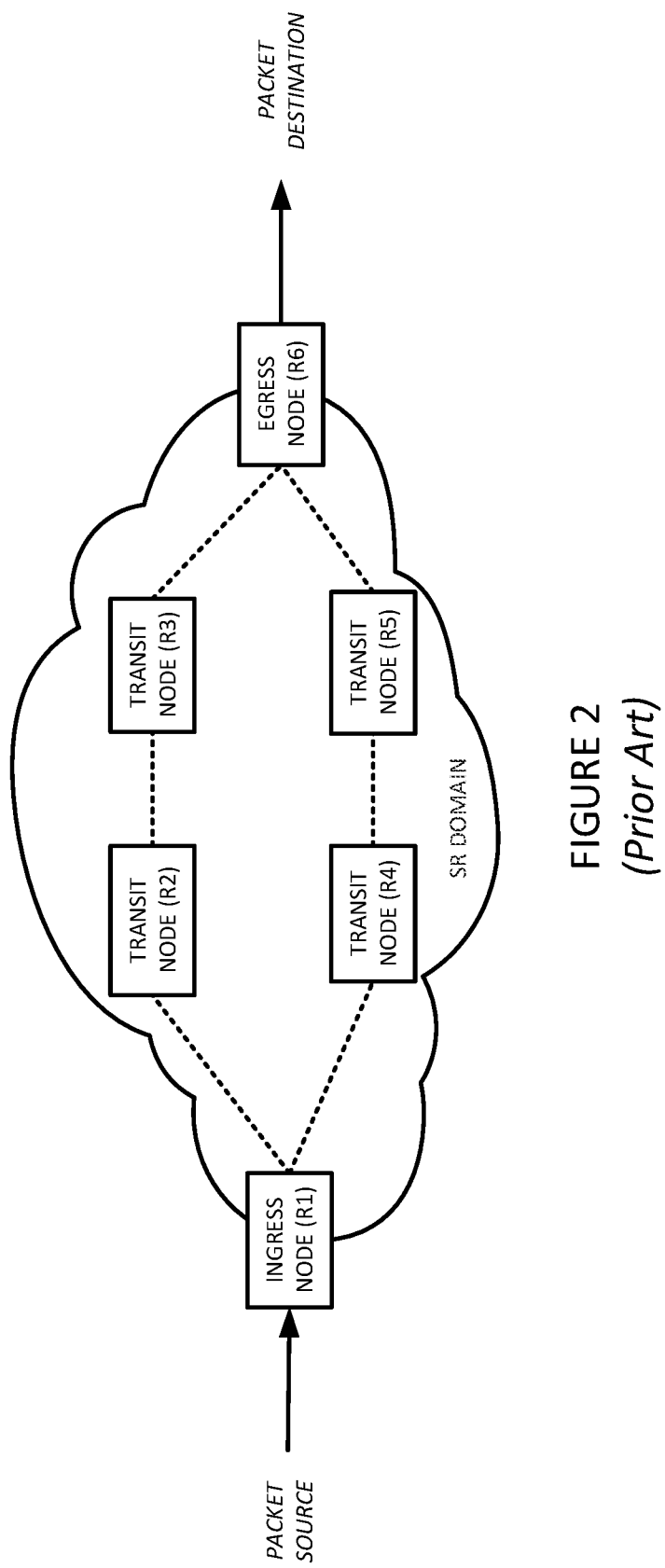
FIG. 2 is an example network used to illustrate an SR domain.
Figure 3:
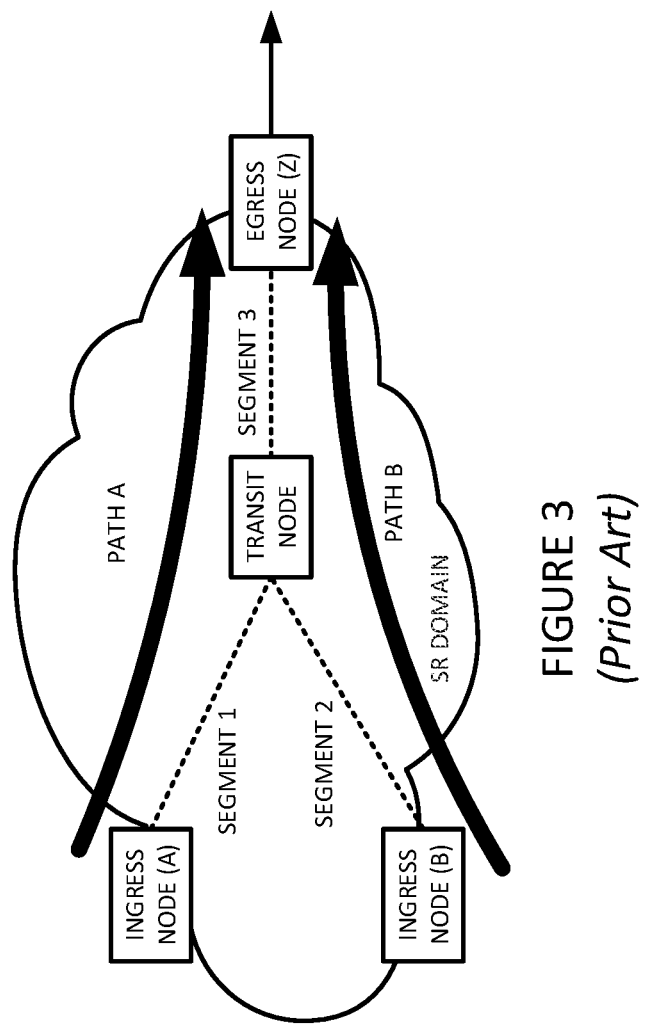
FIG. 3 is an example network used to illustrate SR paths through an SR domain.
Figure 4:
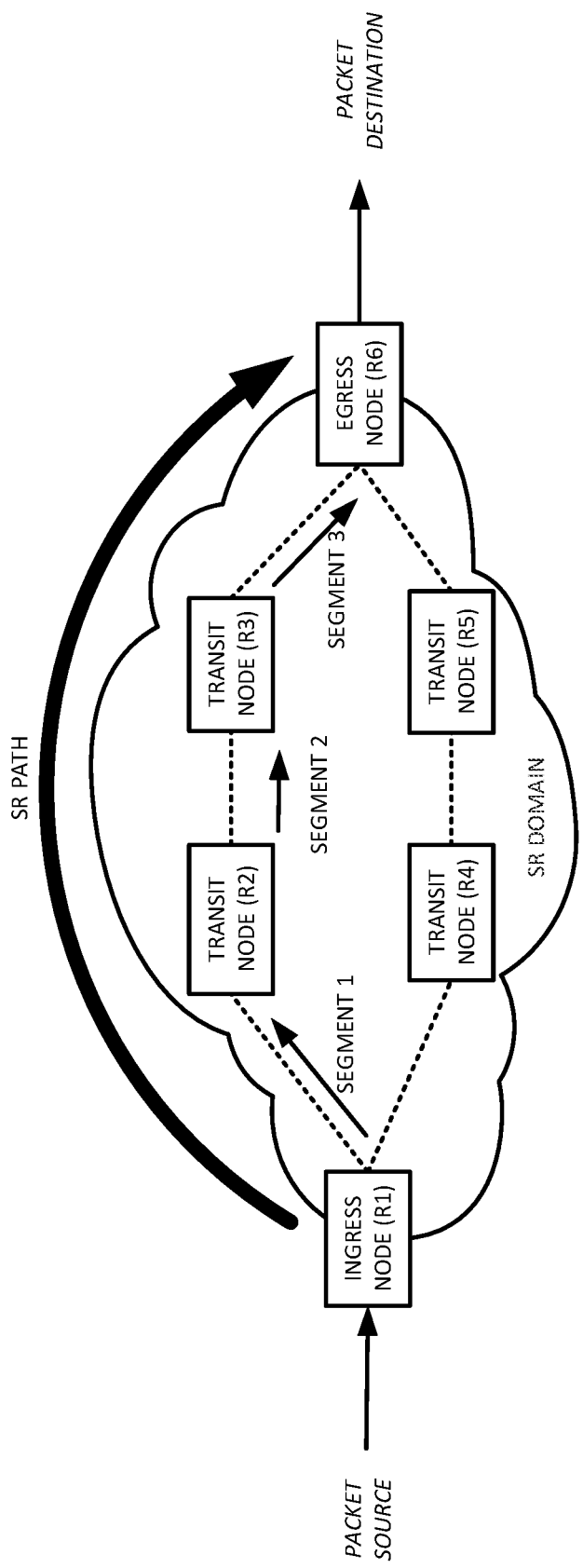
FIG. 4 is an example network used to illustrate adjacency segments in an SR domain.
Figure 5A:
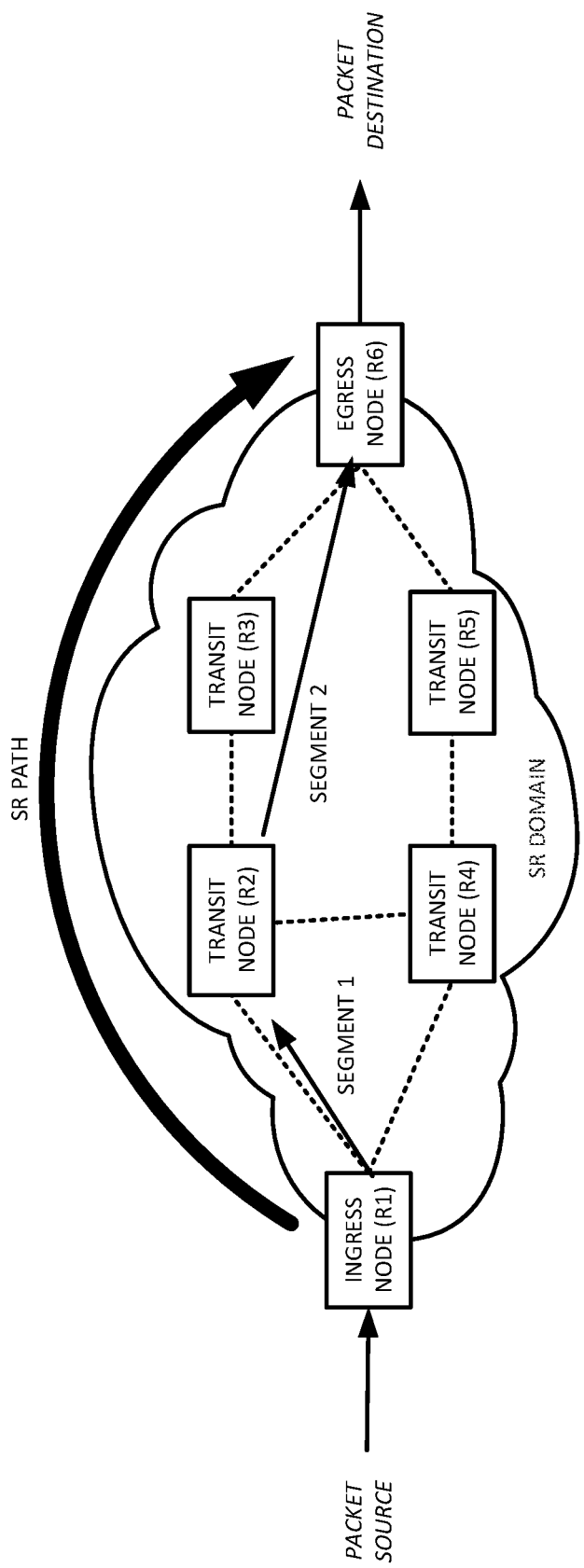
FIGS. 5A and 5B are an example network used to illustrate prefix segments in an SR domain.
Figure 5B:
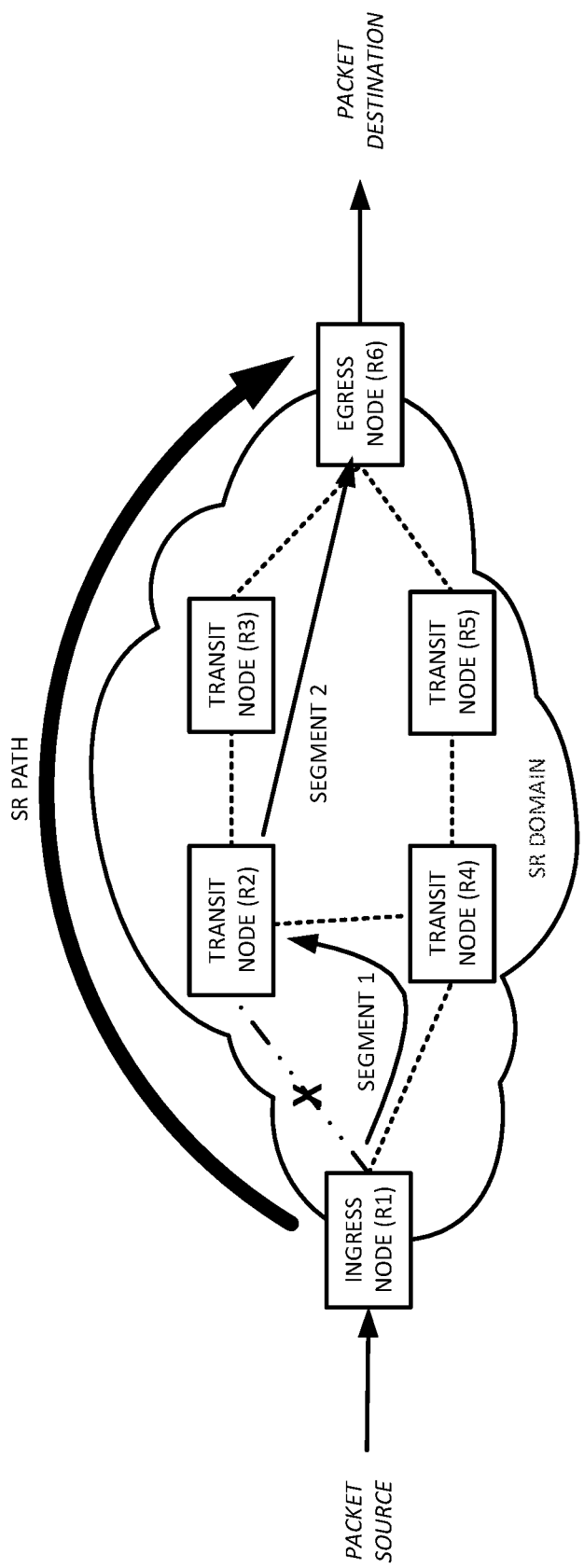
Figure 6:
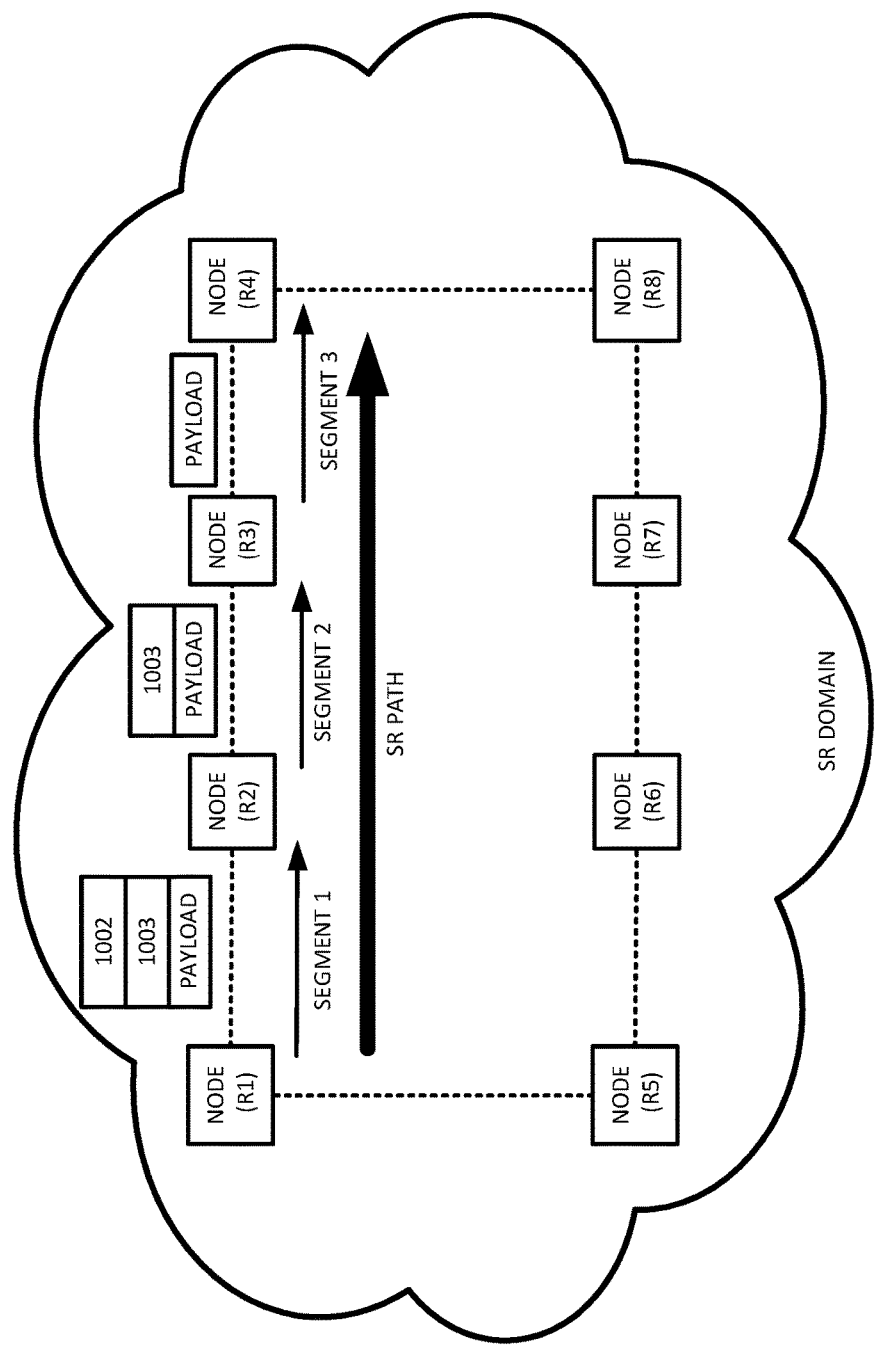
FIG. 6 is an example network used to illustrate the use of MPLS labels derived from adjacency segments.
Figure 7:
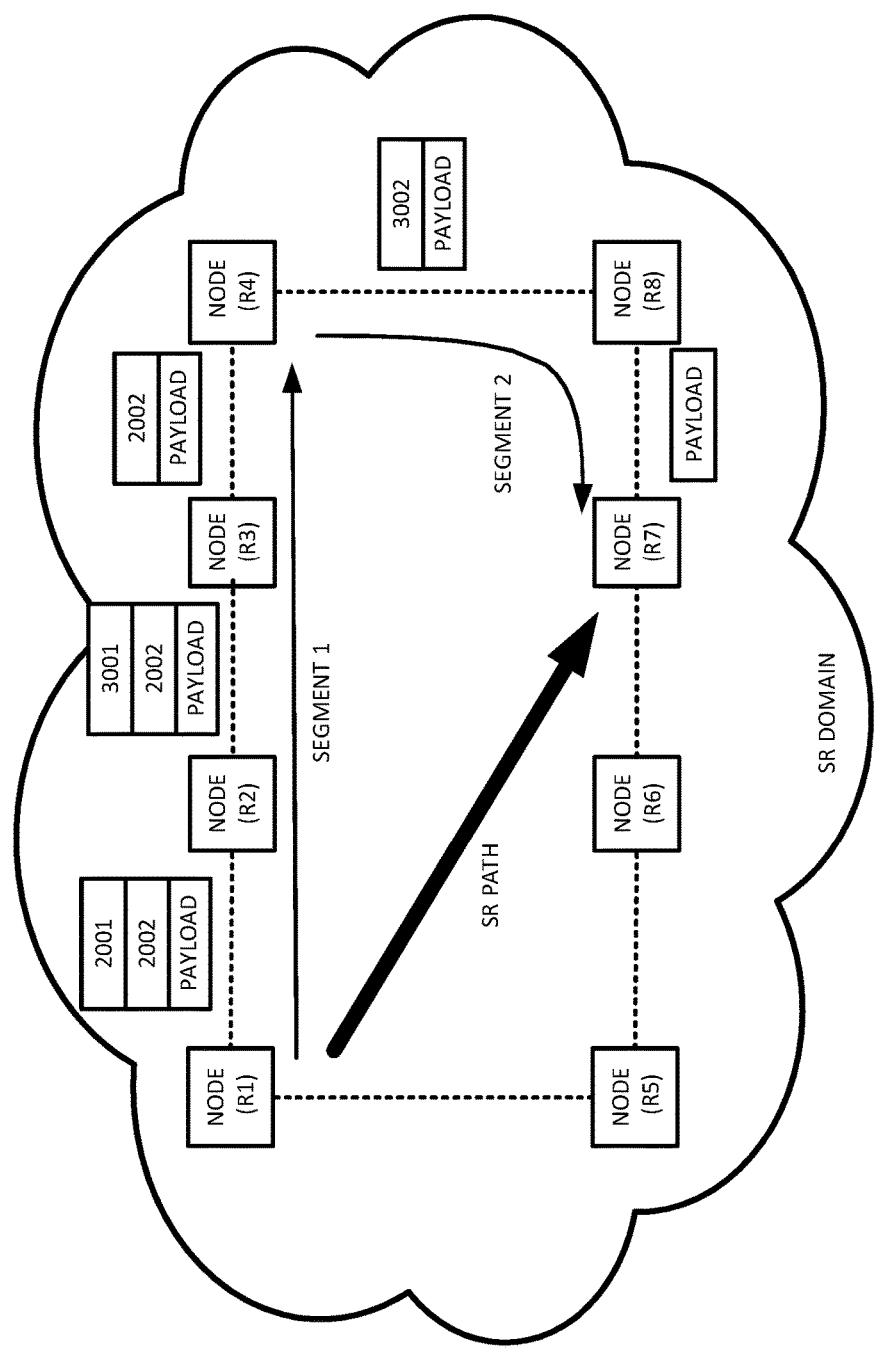
FIG. 7 is an example network used to illustrate the use of MPLS labels derived from prefix segments.
Figure 8:
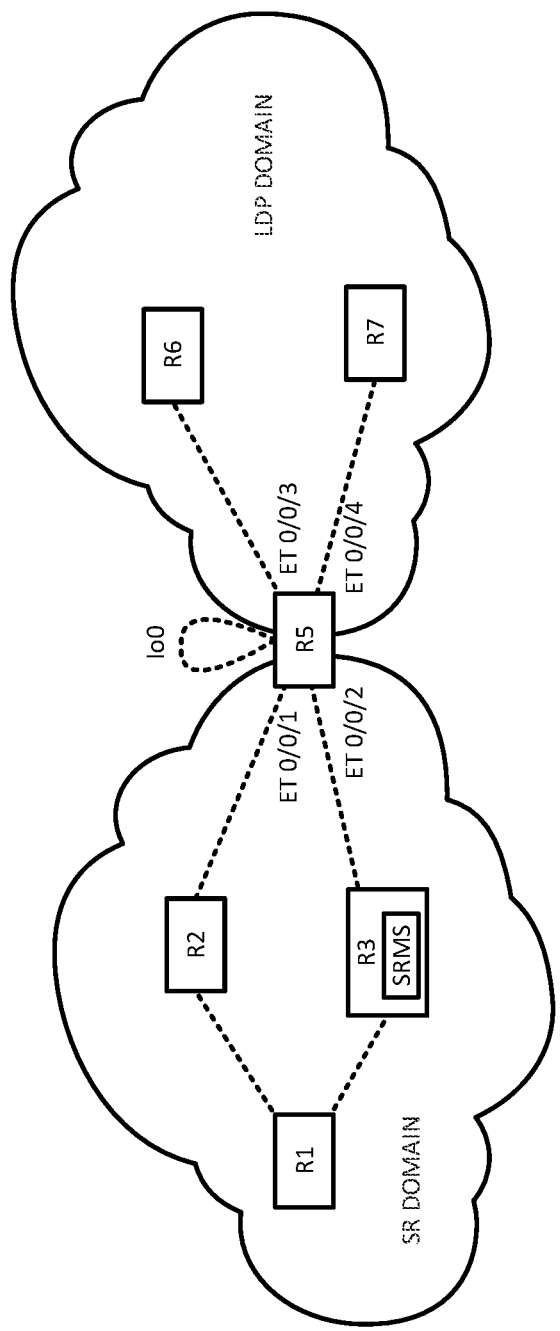
FIG. 8 is an example network topology used to illustrate problems with an existing SR-LDP interoperability solution.
Figures 9A, 9B:
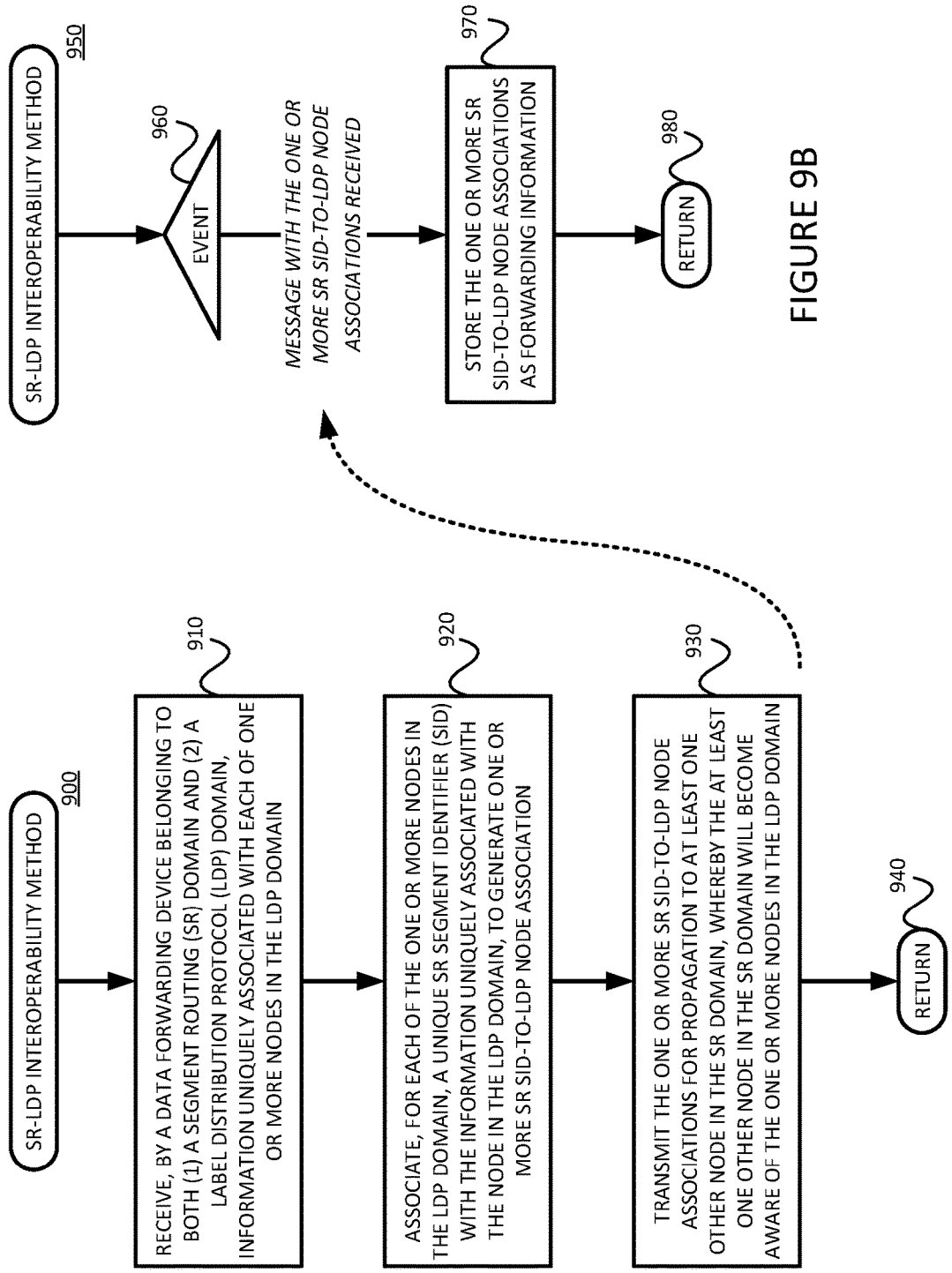
FIGS. 9A and 9B are flow diagrams of an example method for providing SR-LDP interoperability in a manner consistent with the present description.
Figure 16A:
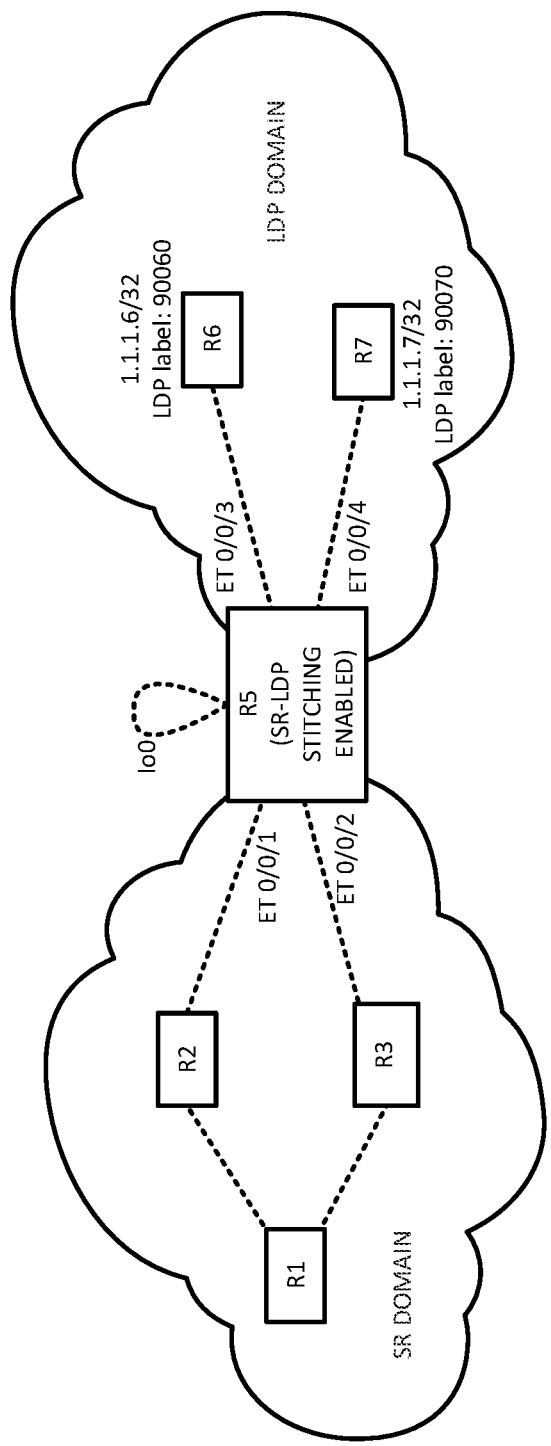
Figure 16B:
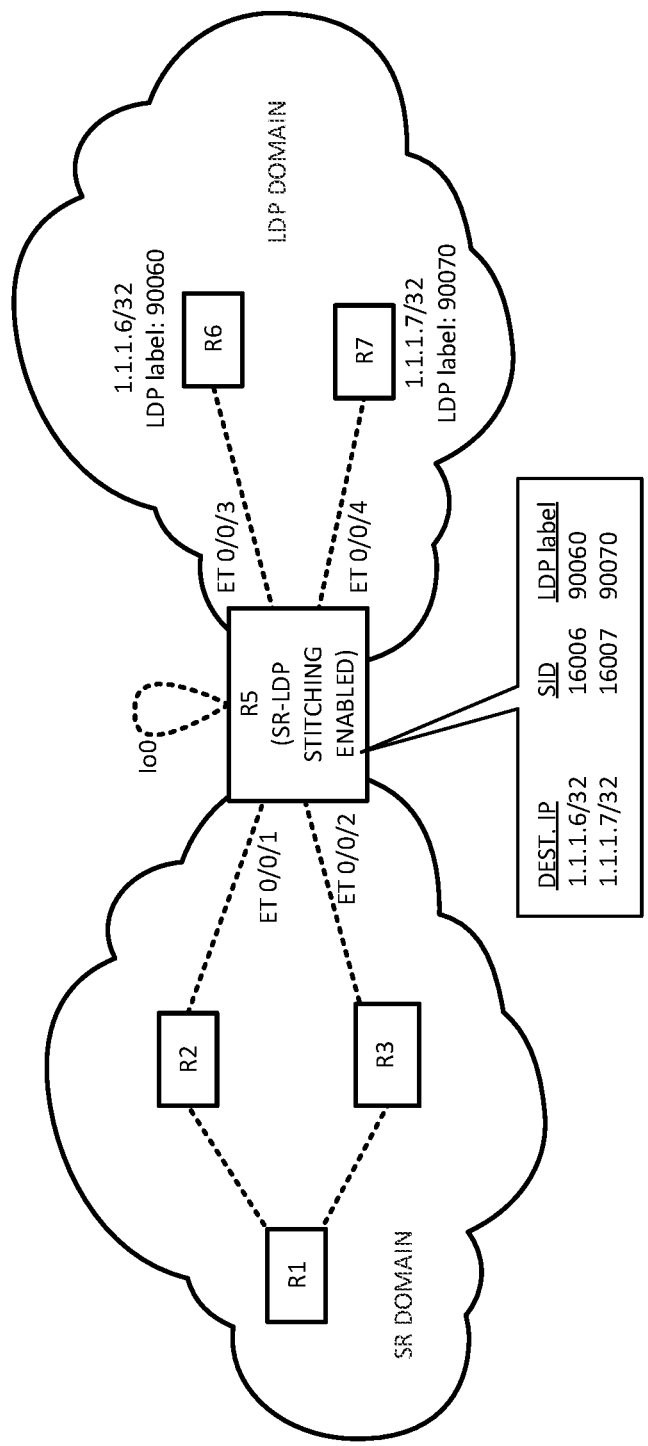
Figure 16C:
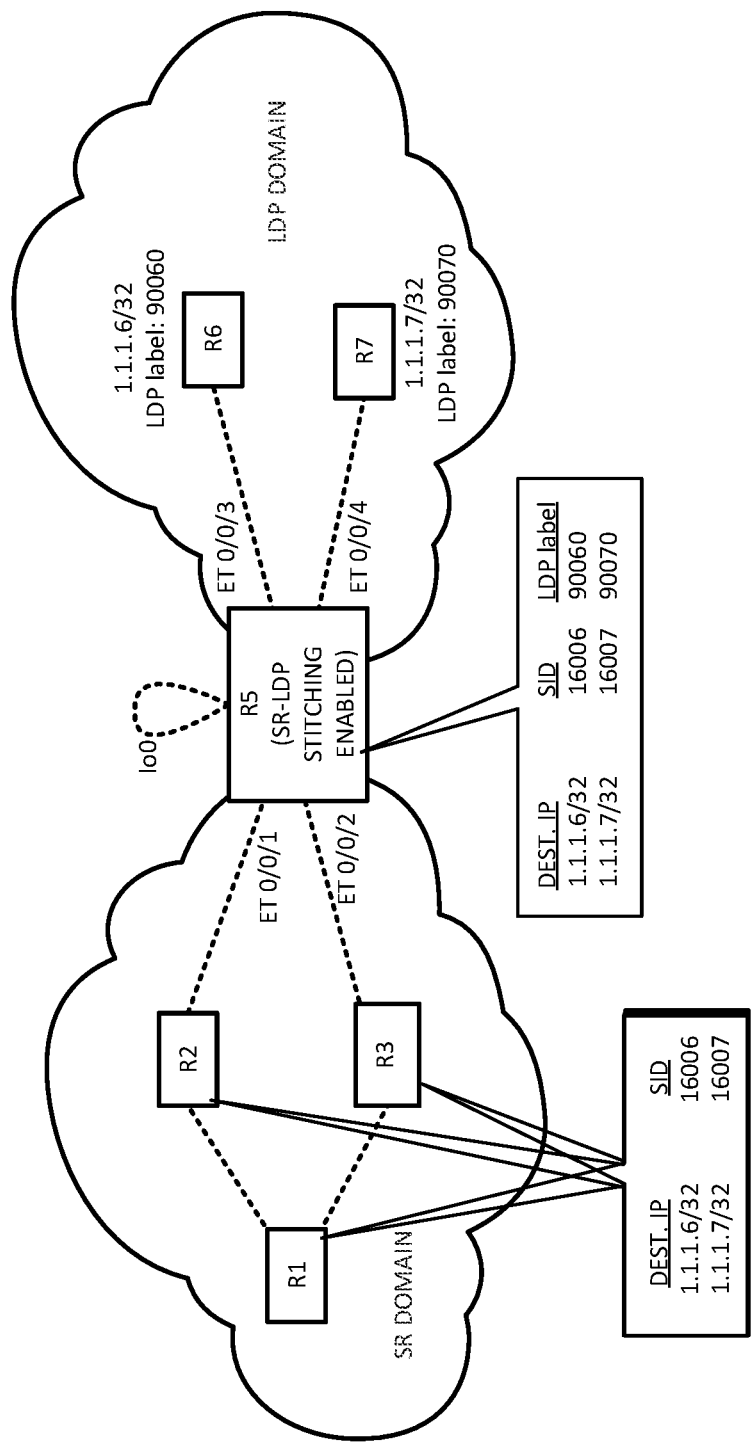

FIGS. 16A-16C provide an example network topology used to illustrate an example of operations of the example method of FIGS. 9A and 9B.

§ 4. DETAILED DESCRIPTION

The present disclosure may involve novel methods, apparatus, message formats, and/or data structures for providing SR-LDP interoperability without needing an SR mapping server. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 EXAMPLE METHODS

FIGS. 9A and 9B are flow diagrams of example methods 900 and 950, respectively, for providing SR-LDP interoperability in a manner consistent with the present description. Referring first to FIG. 9A, the example method 900 is executed by a data forwarding device belonging to both (1) a segment routing (SR) domain and (2) a label distribution protocol (LDP) domain. That is, the data forwarding device may be a border router. As shown, the example method 900 includes receiving, by the data forwarding device, information uniquely associated with each of one or more nodes in the LDP domain. (Block 910) In response to receiving such information, the example method 900 associates, for each of the one or more nodes in the LDP domain, a unique SR segment identifier (SID) with the information uniquely associated with the node in the LDP domain (e.g., IP loopback address of the router in the LDP domain, and possibly the LDP label associated with the router), to generate one or more SR SID-to-LDP node associations. (Block 920) Finally, the example method 900 then transmits the one or more SR SID-to-LDP node (e.g., IP loopback address of the LDP node) associations for propagation to at least one other node in the SR domain, whereby the at least one other node in the SR domain will become aware of the one or more nodes in the LDP domain. (Block 930) The example method 900 is then left. (Node 940)

The example method 300 may be used in a system having at least one other node in the SR domain that does not belong to the LDP domain. The example method 300 may be used in a system in which the one or more nodes in the LDP domain do not belong to the SR domain.

Referring back to block 910, in at least some example embodiments of the example method 900, the information uniquely associated with each of one or more nodes in the LDP domain is received by the data forwarding device via an interior gateway protocol (IGP) and LDP. For example, the IGP may be one of (A) an open shortest path first (OSPF) protocol, or (B) an intermediate system-intermediate system (IS-IS) protocol.

Referring back to block 920 of FIG. 9A, in at least some example embodiments of the example method 900, the information uniquely associated with each of one or more nodes in the LDP domain received by the data forwarding device includes an LDP label associated with the node in the LDP domain. The information uniquely associated with each of one or more nodes in the LDP domain received by the data forwarding device may also include a loopback internet protocol (IP) address of the node in the LDP domain.

Still referring back to block 920 of FIG. 9A, in at least some example embodiments of the example method 900, the act of associating, for each of the one or more nodes in the LDP domain, a unique SR segment identifier (SID) with the information uniquely associated with the node in the LDP domain, generates one or more SR SID-to-LDP IP loopback address bindings.

Referring back to block 930 of FIG. 9A, in at least some example embodiments of the example method 900, the act of transmitting the one or more SR SID-to-LDP node associations for propagation to at least one other node in the SR domain, whereby the at least one other node in the SR domain will become aware of the one or more nodes in the LDP domain, is performed using an interior gateway protocol (IGP) message carrying a type, length, value (TLV) binding. This may be done in accordance with the document, A. Bashandy, et al., "Segment Routing interworking with LDP," *draft-ietf-spring-segment-routing-ldp-interop*-15 (Internet Engineering Task Force, Sep. 2, 2018)(incorporated herein by reference) In at least some such example embodiments, the TLV further encodes (e.g., by setting an assigned bit) that the LDP node is in an LDP domain outside of the SR domain.

Referring to FIG. 9B, in response to receiving a message (e.g., from the border router, via IGP) including one or more SR SID to LDP node associations (Event 960. Recall Block 940), the received SR SID to LDP node associations are stored as forwarding information (Block 970) before the method 950 is left (Node 980). This information may be stored in accordance with the document, A. Bashandy, et al., "Segment Routing interworking with LDP," *draft-ietf-spring-segment-routing-ldp-interop*-15 (Internet Engineering Task Force, Sep. 2, 2018)(incorporated herein by reference).

§ 4.2 EXAMPLE ARCHITECTURES AND APPARATUS

Figure 10:
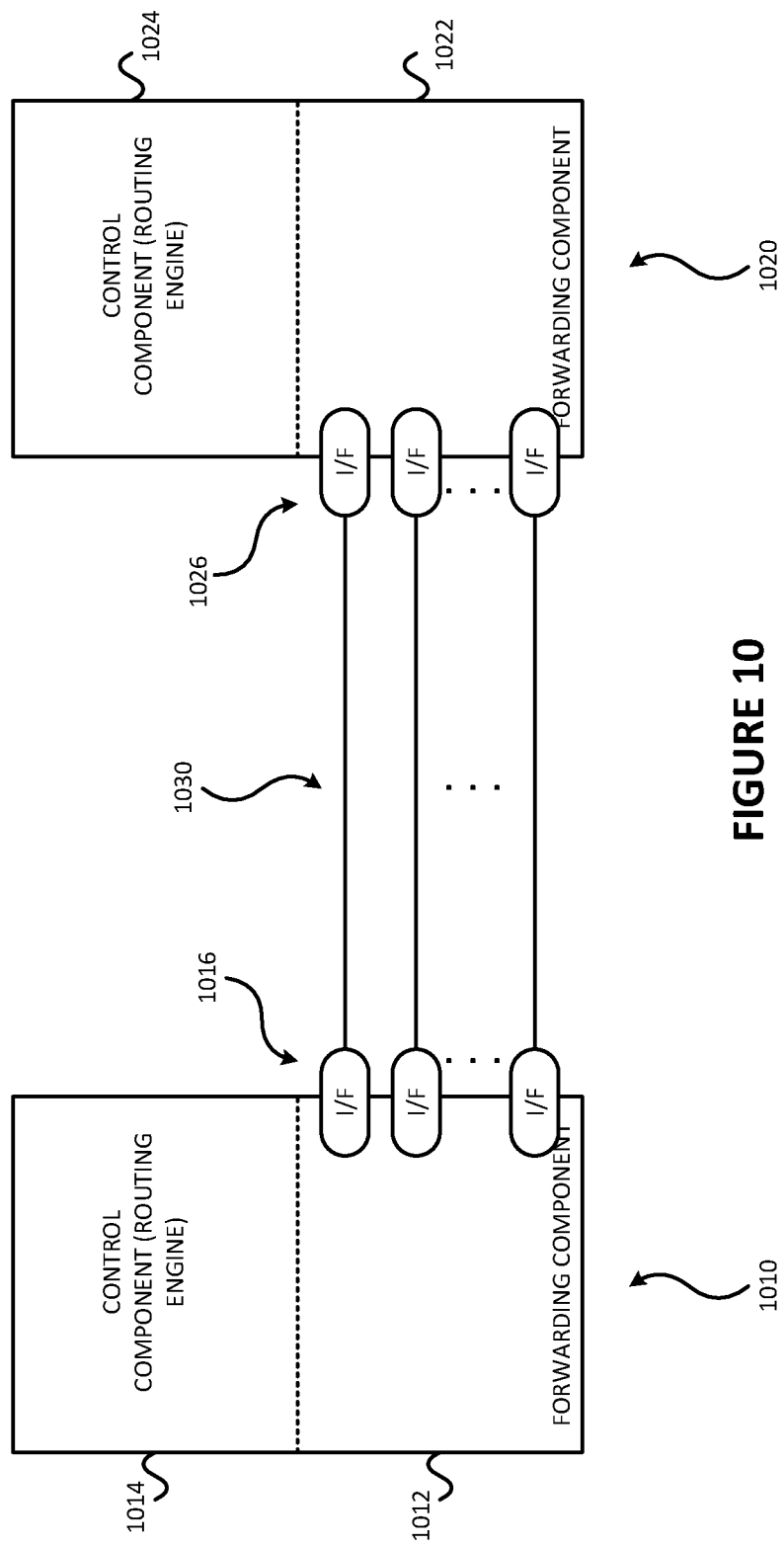
FIG. 10 illustrates an example environment including two systems coupled via communications links.

FIG. 10 illustrates two data forwarding systems 1010 and 1020 coupled via communications links 1030. The links may be physical links or "wireless" links. The data forwarding systems 1010,1020 may be routers for example, and may be BGP peer devices. If the data forwarding systems 1010,1020 are example routers, each may include a control component (e.g., a routing engine) 1014,1024 and a forwarding component 1012,1022. Each data forwarding system 1010,1020 includes one or more interfaces 1016,1026 that terminate one or more communications links 1030. The example method 900 (or instances thereof) may be implemented in the control components 1014,1024.

As just discussed above, and referring to FIG. 11, some example routers 1100 include a control component (e.g., routing engine) 1110 and a packet forwarding component (e.g., a packet forwarding engine) 1190. The example method 900 may be implemented in the control components 1110.

The control component 1110 may include an operating system (OS) kernel 1120, routing protocol process(es) 1130, label-based forwarding protocol process(es) 1140, interface process(es) 1150, user interface (e.g., command line interface) process(es) 1160, and chassis process(es) 1170, and may store routing table(s) 1139, label forwarding information 1145, and forwarding (e.g., route-based and/or label-based) table(s) 1180. As shown, the routing protocol process(es) 1130 may support routing protocols such as the routing information protocol ("RIP") 1131, the intermediate system-to-intermediate system protocol ("IS-IS") 1132, the open shortest path first protocol ("OSPF") 1133, the enhanced interior gateway routing protocol ("EIGRP") 1134 and the boarder gateway protocol ("BGP") 1135, and the label-based forwarding protocol process(es) 1140 may support protocols such as BGP 1135, the label distribution protocol ("LDP") 1136 and the resource reservation protocol ("RSVP") 1137. One or more components (not shown) may permit a user 1165 to interact with the user interface process(es) 1160. Similarly, one or more components (not shown) may permit an outside device to interact with one or more of the router protocol process(es) 1130, the label-based forwarding protocol process(es) 1140, the interface process(es) 1150, and the chassis process(es) 1170, via SNMP 1185, and such processes may send information to an outside device via SNMP 1185. The example method 900 may be implemented in one or more routing protocol process(es) 1130, and/or label-based forwarding protocol process(es) 1140.

The packet forwarding component 1190 may include a microkernel 1192, interface process(es) 1193, distributed ASICs 1194, chassis process(es) 1195 and forwarding (e.g., route-based and/or label-based) table(s) 1196.

Figure 11:
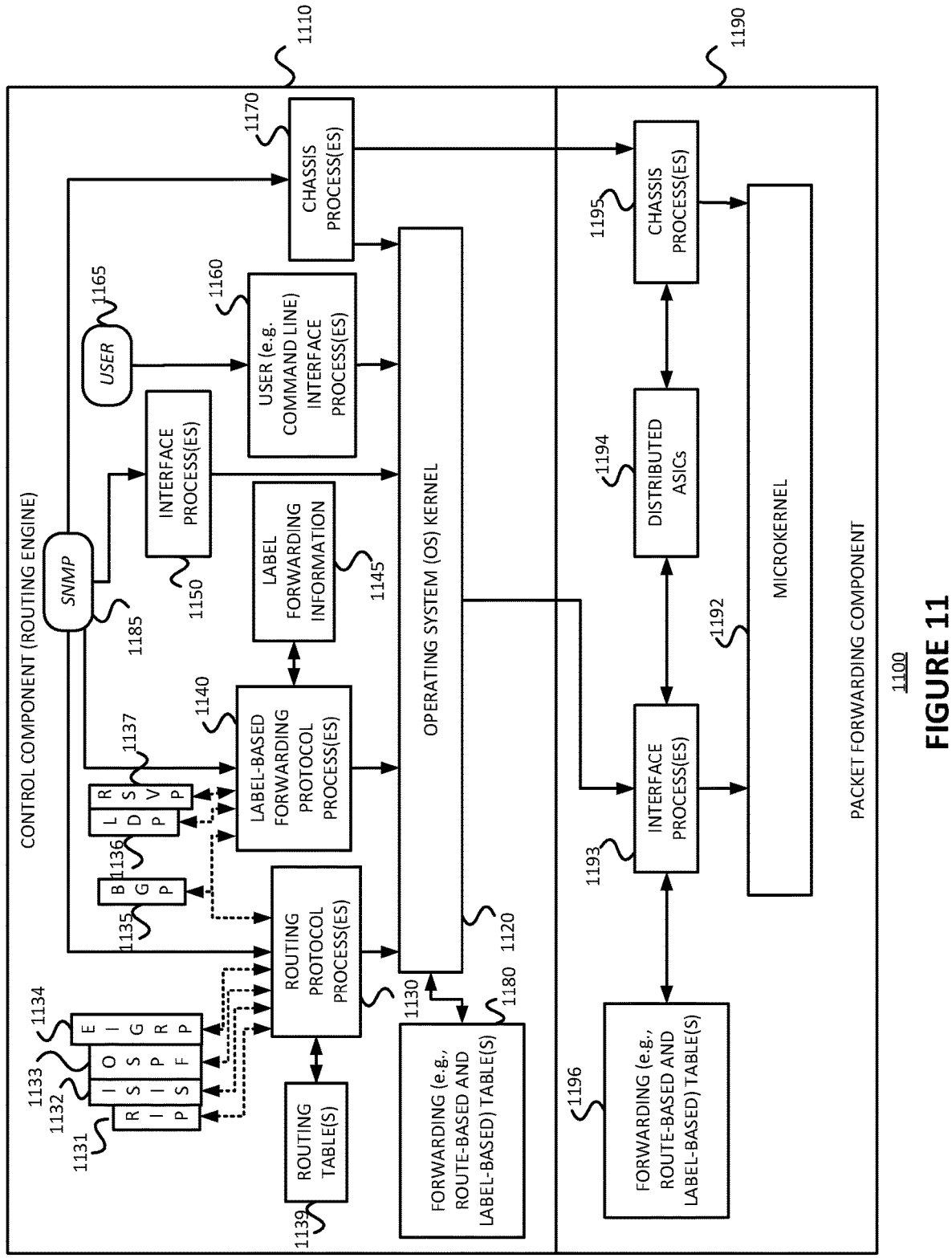
FIG. 11 is a block diagram of an example router on which the example methods of the present description may be implemented.

In the example router 1100 of FIG. 11, the control component 1110 handles tasks such as performing routing protocols, performing label-based forwarding protocols, control packet processing, etc., which frees the packet forwarding component 1190 to forward received packets quickly. That is, received control packets (e.g., routing protocol packets and/or label-based forwarding protocol packets) are not fully processed on the packet forwarding component 1190 itself, but are passed to the control component 1110, thereby reducing the amount of work that the packet forwarding component 1190 has to do and freeing it to process packets to be forwarded efficiently. Thus, the control component 1110 is primarily responsible for running routing protocols and/or label-based forwarding protocols, maintaining the routing tables and/or label forwarding information, sending forwarding table updates to the packet forwarding component 1190, and performing system management. The example control component 1110 may handle routing protocol packets, provide a management interface, provide configuration management, perform accounting, and provide alarms. The processes 1130, 1140, 1150, 1160 and 1170 may be modular, and may interact with the OS kernel 1120. That is, nearly all of the processes communicate directly with the OS kernel 1120. Using modular software that cleanly separates processes from each other isolates problems of a given process so that such problems do not impact other processes that may be running. Additionally, using modular software facilitates easier scaling.

Still referring to FIG. 11, the example OS kernel 1120 may incorporate an application programming interface ("API") system for external program calls and scripting capabilities. The control component 1110 may be based on an Intel PCI platform running the OS from flash memory, with an alternate copy stored on the router's hard disk. The OS kernel 1120 is layered on the Intel PCI platform and establishes communication between the Intel PCI platform and processes of the control component 1110. The OS kernel 1120 also ensures that the forwarding tables 1196 in use by the packet forwarding component 1190 are in sync with those 1180 in the control component 1110. Thus, in addition to providing the underlying infrastructure to control component 1110 software processes, the OS kernel 1120 also provides a link between the control component 1110 and the packet forwarding component 1190.

Referring to the routing protocol process(es) 1130 of FIG. 11, this process(es) 1130 provides routing and routing control functions within the platform. In this example, the RIP 1131, ISIS 1132, OSPF 1133 and EIGRP 1134 (and BGP 1135) protocols are provided. Naturally, other routing protocols may be provided in addition, or alternatively. Similarly, the label-based forwarding protocol process(es) 1140 provides label forwarding and label control functions. In this example, the LDP 1136 and RSVP 1137 (and BGP 1135) protocols are provided. Naturally, other label-based forwarding protocols (e.g., MPLS) may be provided in addition, or alternatively. In the example router 1100, the routing table(s) 1139 is produced by the routing protocol process(es) 1130, while the label forwarding information 1145 is produced by the label-based forwarding protocol process(es) 1140.

Still referring to FIG. 11, the interface process(es) 1150 performs configuration of the physical interfaces (Recall, e.g., 1016 and 1026 of FIG. 10.) and encapsulation.

The example control component 1110 may provide several ways to manage the router. For example, it 1110 may provide a user interface process(es) 1160 which allows a system operator 1165 to interact with the system through configuration, modifications, and monitoring. The SNMP 1185 allows SNMP-capable systems to communicate with the router platform. This also allows the platform to provide necessary SNMP information to external agents. For example, the SNMP 1185 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 1110, thereby avoiding slowing traffic forwarding by the packet forwarding component 1190.

Although not shown, the example router 1100 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 1160 via a console port, an auxiliary port, and/or a management Ethernet port The packet forwarding component 1190 is responsible for properly outputting received packets as quickly as possible. If there is no entry in the forwarding table for a given destination or a given label and the packet forwarding component 1190 cannot perform forwarding by itself, it 1190 may send the packets bound for that unknown destination off to the control component 1110 for processing. The example packet forwarding component 1190 is designed to perform Layer 2 and Layer 3 switching, route lookups, and rapid packet forwarding.

As shown in FIG. 11, the example packet forwarding component 1190 has an embedded microkernel 1192, interface process(es) 1193, distributed ASICs 1194, and chassis process(es) 1195, and stores a forwarding (e.g., route-based and/or label-based) table(s) 1196. The microkernel 1192 interacts with the interface process(es) 1193 and the chassis process(es) 1195 to monitor and control these functions. The interface process(es) 1192 has direct communication with the OS kernel 1120 of the control component 1110. This communication includes forwarding exception packets and control packets to the control component 1110, receiving packets to be forwarded, receiving forwarding table updates, providing information about the health of the packet forwarding component 1190 to the control component 1110, and permitting configuration of the interfaces from the user interface (e.g., CLI) process(es) 1160 of the control component 1110. The stored forwarding table(s) 1196 is static until a new one is received from the control component 1110. The interface process(es) 1193 uses the forwarding table(s) 1196 to look up next-hop information. The interface process(es) 1193 also has direct communication with the distributed ASICs 1194. Finally, the chassis process(es) 1195 may communicate directly with the microkernel 1192 and with the distributed ASICs 1194.

Figure 12:
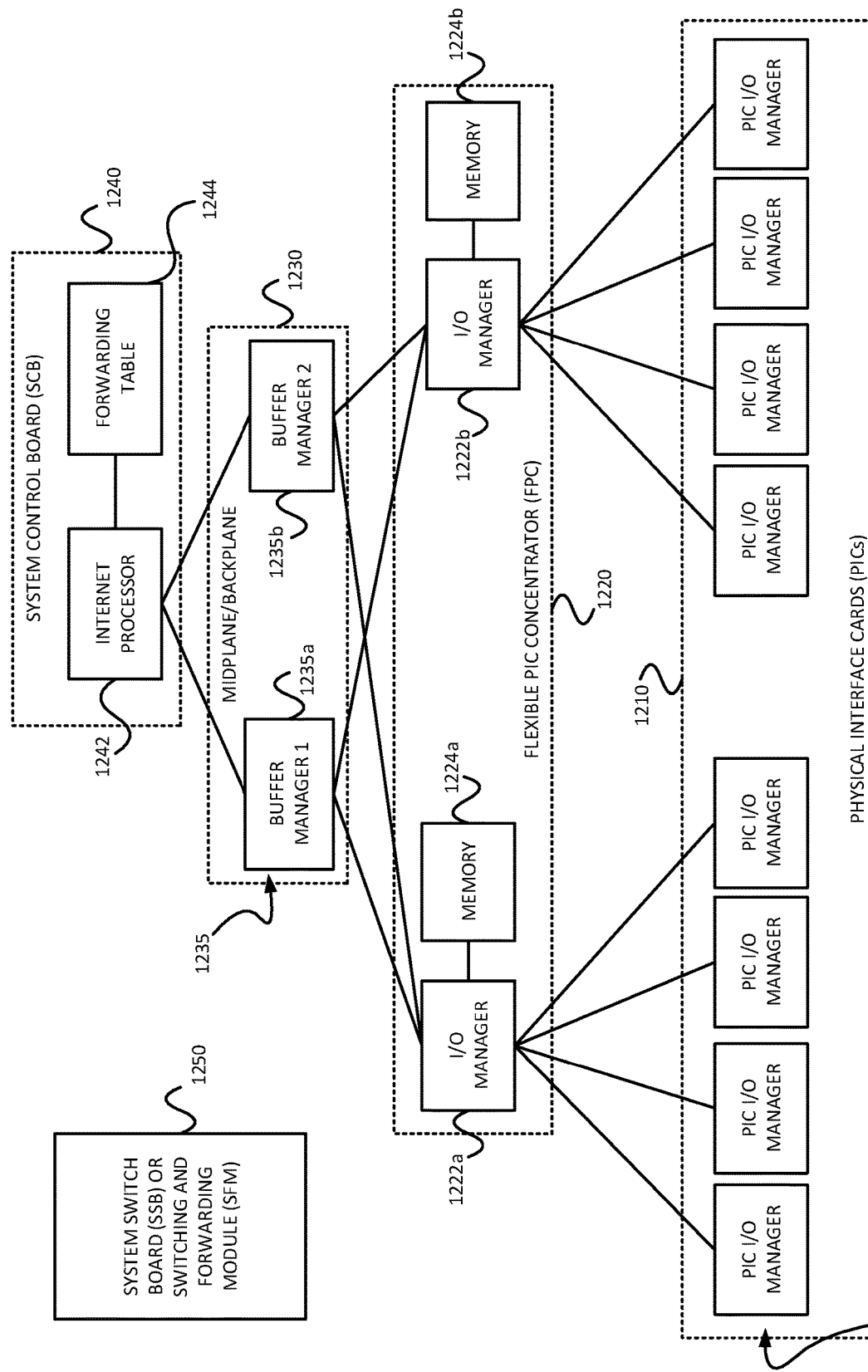
FIG. 12 is a block diagram of example distributed application specific integrated circuits ("ASICs") that may be provided in the example router of FIG. 11.

Referring back to distributed ASICs 1194 of FIG. 11, FIG. 12 is an example of how the ASICS may be distributed in the packet forwarding component 1190 to divide the responsibility of packet forwarding. As shown in FIG. 12, the ASICs of the packet forwarding component 1190 may be distributed on physical interface cards ("PICs") 1210, flexible PIC concentrators ("FPCs") 1220, a midplane or backplane 1230, and a system control board(s) 1240 (for switching and/or forwarding). Switching fabric is also shown as a system switch board ("SSB"), or a switching and forwarding module ("SFM") 1250. Each of the PICs 1210 includes one or more PIC I/O managers 1215. Each of the FPCs 1220 includes one or more I/O managers 1222, each with an associated memory 1224. The midplane/backplane 1230 includes buffer managers 1235a, 1235b. Finally, the system control board 1240 includes an internet processor 1242 and an instance of the forwarding table 1244 (Recall, e.g., 1196 of FIG. 11).

Still referring to FIG. 12, the PICs 1210 contain the interface ports. Each PIC 1210 may be plugged into an FPC 1220. Each individual PIC 1210 may contain an ASIC that handles media-specific functions, such as framing or encapsulation. Some example PICs 1210 provide SDH/SONET, ATM, Gigabit Ethernet, Fast Ethernet, and/or DS3/E3 interface ports.

An FPC 1220 can contain from one or more PICs 1210, and may carry the signals from the PICs 1210 to the midplane/backplane 1230 as shown in FIG. 12.

The midplane/backplane 1230 holds the line cards. The line cards may connect into the midplane/backplane 1230 when inserted into the example router's chassis from the front. The control component (e.g., routing engine) 1110 may plug into the rear of the midplane/backplane 1230 from the rear of the chassis. The midplane/backplane 1230 may carry electrical (or optical) signals and power to each line card and to the control component 1110.

The system control board 1240 may perform forwarding lookup. It 1240 may also communicate errors to the routing engine. Further, it 1240 may also monitor the condition of the router based on information it receives from sensors. If an abnormal condition is detected, the system control board 1240 may immediately notify the control component 1110.

Figure 13A:
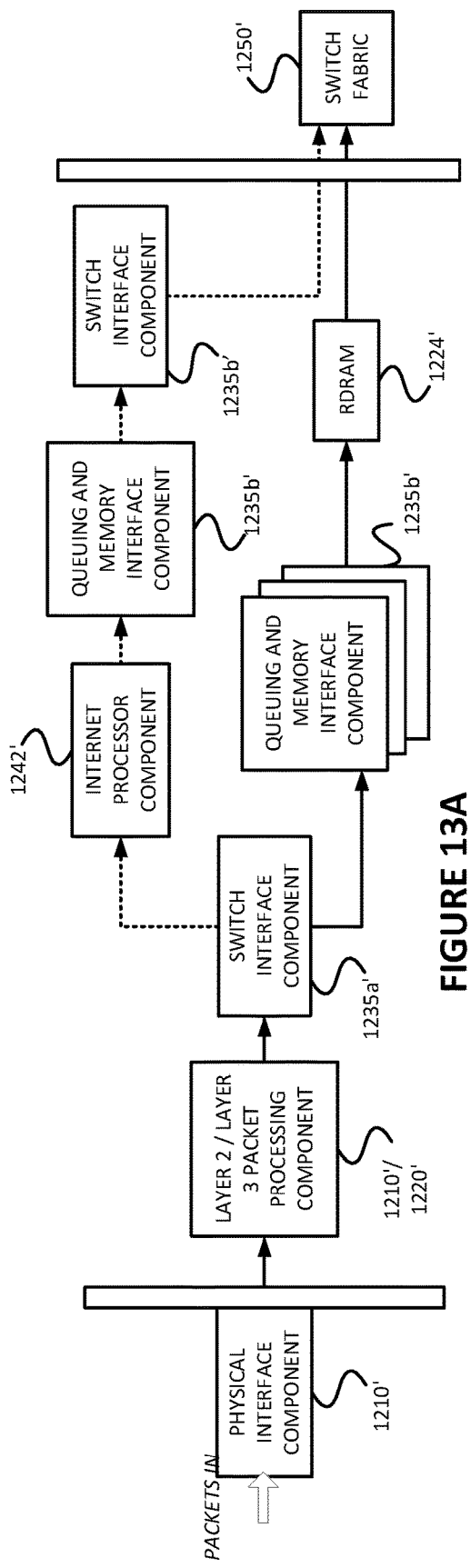
FIGS. 13A and 13B illustrate example packet forwarding operations of the example distributed ASICs of FIG. 12.
Figure 13B:
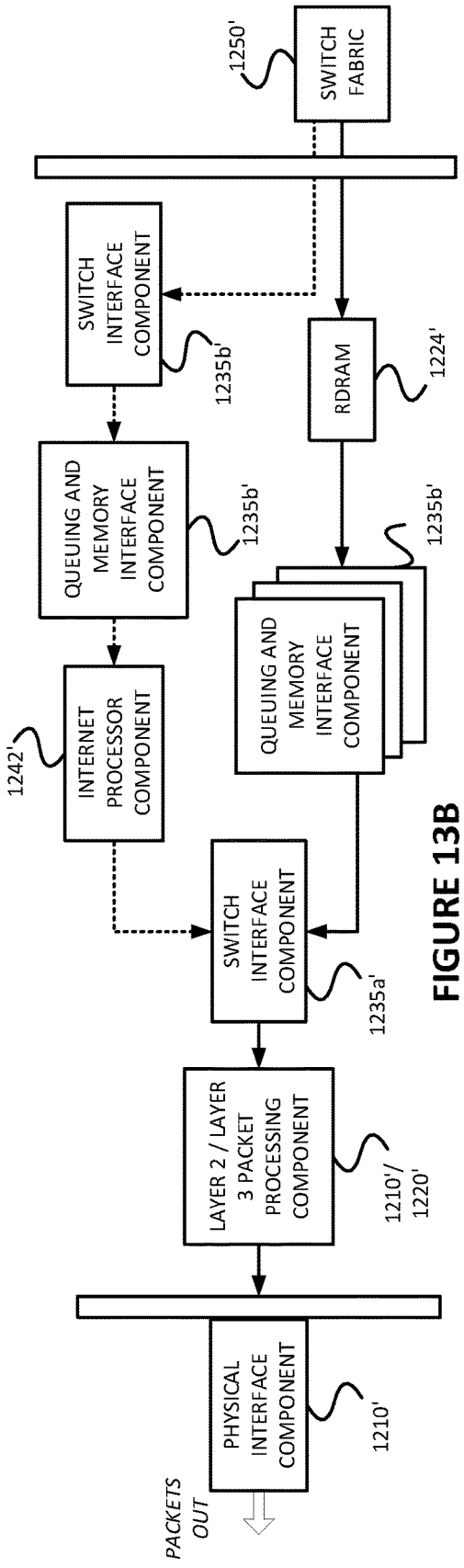

Referring to FIGS. 12, 13A and 13B, in some exemplary routers, each of the PICs 1210,1110' contains at least one I/O manager ASIC 1215 responsible for media-specific tasks, such as encapsulation. The packets pass through these I/O ASICs on their way into and out of the router. The I/O manager ASIC 1215 on the PIC 1211,1011' is responsible for managing the connection to the I/O manager ASIC 1222 on the FPC 1220,1120', managing link-layer framing and creating the bit stream, performing cyclical redundancy checks (CRCs), and detecting link-layer errors and generating alarms, when appropriate. The FPC 1220 includes another I/O manager ASIC 1222. This ASIC 1222 takes the packets from the PICs 1210 and breaks them into (e.g., 74-byte) memory blocks. This FPC I/O manager ASIC 1222 sends the blocks to a first distributed buffer manager (DBM) 1235$a'$, decoding encapsulation and protocol-specific information, counting packets and bytes for each logical circuit, verifying packet integrity, and applying class of service (CoS) rules to packets. At this point, the packet is first written to memory. More specifically, the example DBM ASIC 1235$a'$ manages and writes packets to the shared memory 1224 across all FPCs 1220. In parallel, the first DBM ASIC 1235$a'$ also extracts information on the destination of the packet and passes this forwarding-related information to the Internet processor 1242/1142'. The Internet processor 1242/1142' performs the route lookup using the forwarding table 1244 and sends the information over to a second DBM ASIC 1235$b'$. The Internet processor ASIC 1242/1142' also collects exception packets (i.e., those without a forwarding table entry) and sends them to the control component 1110. The second DBM ASIC 1235$b'$ then takes this information and the 74-byte blocks and forwards them to the I/O manager ASIC 1222 of the egress FPC 1220/1120' (or multiple egress FPCs, in the case of multicast) for reassembly. (Thus, the DBM ASICs 1235$a'$ and 1235$b'$ are responsible for managing the packet memory 1224 distributed across all FPCs 1220/1120', extracting forwarding-related information from packets, and instructing the FPC where to forward packets.)

The I/O manager ASIC 1222 on the egress FPC 1220/1120' may perform some value-added services. In addition to incrementing time to live ("TTL") values and re-encapsulating the packet for handling by the PIC 1210, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 1222 on the egress FPC 1220/1120' may be responsible for receiving the blocks from the second DBM ASIC 1235$b'$, incrementing TTL values, queuing a pointer to the packet, if necessary, before applying CoS rules, re-encapsulating the blocks, and sending the encapsulated packets to the PIC I/O manager ASIC 1215.

Figure 14:
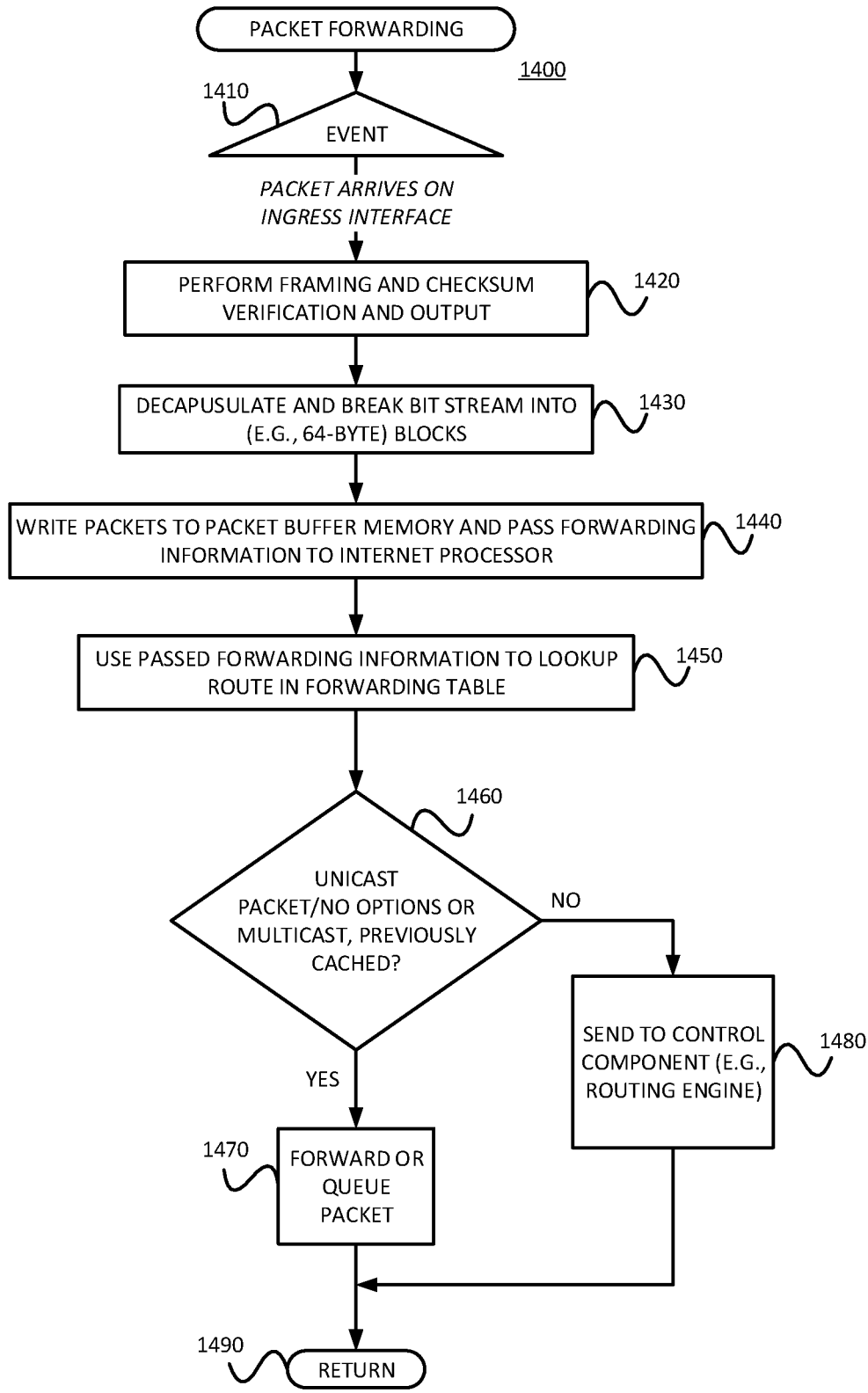
FIG. 14 is a flow diagram of an example packet forwarding method that may be implemented on any of the example routers of FIGS. 11 and 12.

FIG. 14 is a flow diagram of an example method 1400 for providing packet forwarding in the example router. The main acts of the method 1400 are triggered when a packet is received on an ingress (incoming) port or interface. (Event 1410) The types of checksum and frame checks that are required by the type of medium it serves are performed and the packet is output, as a serial bit stream. (Block 1420) The packet is then decapsulated and parsed into (e.g., 64-byte) blocks. (Block 1430) The packets are written to buffer memory and the forwarding information is passed on the Internet processor. (Block 1440) The passed forwarding information is then used to lookup a route in the forwarding table. (Block 1450) Note that the forwarding table can typically handle unicast packets that do not have options (e.g., accounting) set, and multicast packets for which it already has a cached entry. Thus, if it is determined that these conditions are met (YES branch of Decision 1460), the packet forwarding component finds the next hop and egress interface, and the packet is forwarded (or queued for forwarding) to the next hop via the egress interface (Block 1470) before the method 1400 is left (Node 1490) Otherwise, if these conditions are not met (NO branch of Decision 1460), the forwarding information is sent to the control component 1110 for advanced forwarding resolution (Block 1480) before the method 1400 is left (Node 1490).

Referring back to block 1470, the packet may be queued. Actually, as stated earlier with reference to FIG. 12, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1222 may send a request for the packet to the second DBM ASIC 1235$b$. The DBM ASIC 1235 reads the blocks from shared memory and sends them to the I/O manager ASIC 1222 on the FPC 1220, which then serializes the bits and sends them to the media-specific ASIC of the egress interface. The I/O manager ASIC 1215 on the egress PIC 1210 may apply the physical-layer framing, perform the CRC, and send the bit stream out over the link.

Referring back to block 1480 of FIG. 14, as well as FIG. 12, regarding the transfer of control and exception packets, the system control board 1240 handles nearly all exception packets. For example, the system control board 1240 may pass exception packets to the control component 1110.

Although example embodiments consistent with the present invention may be implemented on the example routers of FIG. 10 or 11, embodiments consistent with the present invention may be implemented on communications network nodes (e.g., routers, switches, etc.) having different architectures. More generally, embodiments consistent with the present invention may be implemented on an example system 1500 as illustrated on FIG. 15.

Figure 15:
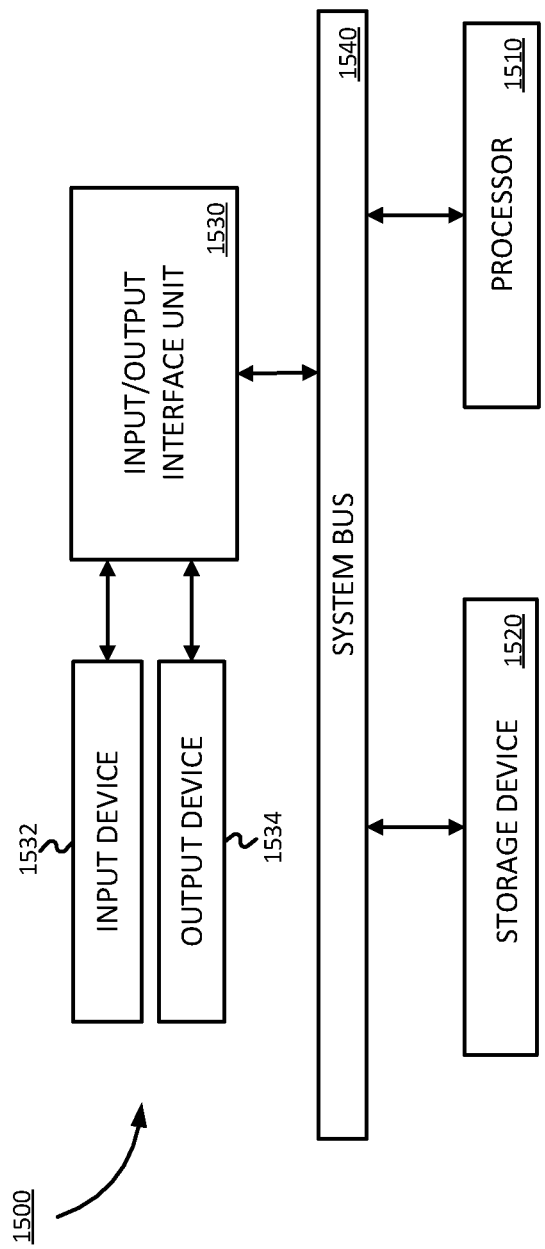
FIG. 15 is a block diagram of an example processor-based system that may be used to execute the example methods and/or to store information used and/or generated by such example methods.

FIG. 15 is a block diagram of an exemplary machine 1500 that may perform one or more of the processes described, and/or store information used and/or generated by such processes. The exemplary machine 1500 includes one or more processors 1510, one or more input/output interface units 1530, one or more storage devices 1520, and one or more system buses and/or networks 1540 for facilitating the communication of information among the coupled elements. One or more input devices 1532 and one or more output devices 1534 may be coupled with the one or more input/output interfaces 1530. The one or more processors 1510 may execute machine-executable instructions (e.g., C or C++ running on the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1520 and/or may be received from an external source via one or more input interface units 1530. The machine executable instructions may be stored as various software modules, each module performing one or more operations. Functional software modules are examples of components of the invention.

In some embodiments consistent with the present invention, the processor 1510 may be one or more microprocessors and/or ASICs. The bus 1540 may include a system bus. The storage device 1520 may include system memory, such as read only memory (ROM) and/or random access memory (RAM). The storage devices 1520 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present invention (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a server (e.g., a software defined network controller), a tablet computer, a mobile phone, or any device that has computing and networking capabilities.

§ 4.3 EXAMPLES OF OPERATIONS OF EXAMPLE METHODS

FIGS. 16A-16C provide an example network topology used to illustrate an example of operations of the example method of FIGS. 9A and 9B. Referring first to FIG. 16A, in this example topology, routers R1-R3 belong to the SR domain but not the LDP domain, routers R6 and R7 belong to the LDP domain but not the SR domain, and router R5 is a border router belonging to both the SR domain and the LDP domain. The router R5 has an interface ET 0/0/1 with R2, an interface ET 0/0/2 with R3, an interface ET 0/0/3 with R6, an interface ET 0/0/4 with R7, and a loopback interface lo0. R6 has an IP address of 1.1.1.6/32 and an LDP label of 90060. R7 has an IP address of 1.1.1.7/32 and an LDP label of 90070.

Referring to FIG. 16B, assume that R5 learns about (e.g., via an IGP) the IP address and LDP label for each of R6 and R7. (Recall, e.g., block 910 of FIG. 9A.) As shown, R5 associates each of these information with a unique SID. (Recall, e.g., block 920.) For example, as shown, the destination IP address 1.1.1.6/32 and LDP label 90060 of R6 is associated with SID 16006, and the destination IP address 1.1.1.7/32 and LDP label 90070 of R7 is associated with SID 16007.

Referring to FIG. 16C, one or more SID to LDP node associations (e.g., a SID label bound to the IP address of the LDP node) are communicated (e.g., via an IGP) to the other nodes (R1-R3) of the SR domain. (Recall e.g., block 930 of FIG. 9A.) The other nodes R1-R3 of the SR domain store these associations.

In this way, any of the nodes in the SR domain (R1-R3) can reach a node in the LDP domain using the SID associated with the LDP node's IP address. This SID can be used to forward traffic to R5. R5 can then exchange the SID for the associated LDP label. The LDP label can be used in the LDP domain to properly forward this traffic to the appropriate LDP node.

§ 4.4 CONCLUSIONS

In view of the foregoing, the SR-LDP border router is aware of all the nodes in SR and LDP domain including the SRGB database (base label, node label, and label range). Once the border node is configured for LDP-SR stitching it assigns one of the free SR node SID to each LDP node. Subsequently, border node will propagate this binding to all the SR nodes (e.g., using the existing IGP TLVs). One of the available bits in label binding TLV may be set to make the nodes in the SR domain aware of the LDP nodes.

This method will eliminate the need of a statically configuring mapping server and updating the server configuration upon every change in the LDP domain.

What is claimed is:

1. A computer-implemented method for use by a data forwarding device belonging to both (1) a segment routing (SR) domain and (2) a label distribution protocol (LDP) domain, the computer-implemented method comprising:
   a) receiving, by the data forwarding device, information uniquely associated with each of one or more nodes in the LDP domain;
   b) associating, for each of the one or more nodes in the LDP domain, a unique SR segment identifier (SID) with the information uniquely associated with the node in the LDP domain, to generate one or more SR SID-to-LDP node associations; and
   c) transmitting the one or more SR SID-to-LDP node associations for propagation to at least one other node in the SR domain, whereby the at least one other node in the SR domain will become aware of the one or more nodes in the LDP domain,
      wherein the act of transmitting the one or more SR SID-to-LDP node associations for propagation to at least one other node in the SR domain, whereby the at least one other node in the SR domain will become aware of the one or more nodes in the LDP domain, is performed using an interior gateway protocol (IGP) message carrying a type, length, value (TLV), and
      wherein the TLV further encodes, explicitly, that the LDP node is in an LDP domain outside of the SR domain.

2. The computer-implemented method of claim 1, wherein the at least one other node in the SR domain does not belong to the LDP domain.

3. The computer-implemented method of claim 1, wherein the one or more nodes in the LDP domain do not belong to the SR domain.

4. The computer-implemented method of claim 1, wherein the information uniquely associated with each of one or more nodes in the LDP domain is received by the data forwarding device via an interior gateway protocol (IGP) and LDP.

5. The computer-implemented method of claim 4, wherein the IGP is one of (A) an open shortest path first (OSPF) protocol, or (B) an intermediate system-intermediate system (IS-IS) protocol.

6. The computer-implemented method of claim 1, wherein the information uniquely associated with each of one or more nodes in the LDP domain received by the data forwarding device includes an LDP label associated with the node in the LDP domain.

7. The computer-implemented method of claim 1, wherein the information uniquely associated with each of one or more nodes in the LDP domain received by the data forwarding device includes a loopback internet protocol (IP) address of the node in the LDP domain.

8. The computer-implemented method of claim 7, wherein the act of associating, for each of the one or more nodes in the LDP domain, a unique SR segment identifier (SID) with the information uniquely associated with the node in the LDP domain, generates one or more SR SID-to-LDP IP loopback address bindings.

9. The computer-implemented method of claim 8, wherein the act of transmitting the one or more SR SID-to-LDP node associations for propagation to at least one other node in the SR domain, whereby the at least one other node in the SR domain will become aware of the one or more nodes in the LDP domain, is performed using an interior gateway protocol (IGP) message carrying a type, length, value (TLV) binding.

10. The computer-implemented method of claim 1, wherein the TLV further encodes, explicitly, that the LDP node is in an LDP domain outside of the SR domain by setting an assigned bit in the TLV.

11. A data forwarding device belonging to both (1) a segment routing (SR) domain and (2) a label distribution protocol (LDP) domain, the data forwarding device comprising:
   a) at least one processor;
   b) at least one communications interface; and
   c) a computer-readable storage system storing processor-executable instructions which, when executed by the at least one processor, cause the data forwarding device to perform a method including
      1) receiving, via the at least one communications interface of the data forwarding device, information uniquely associated with each of one or more nodes in the LDP domain,
      2) associating, for each of the one or more nodes in the LDP domain, a unique SR segment identifier (SID) with the information uniquely associated with the node in the LDP domain, to generate one or more SR SID-to-LDP node associations,
      3) storing on the computer-readable storage system, the generated one or more SR SID-to-LDP node associations, and
      4) transmitting, via the at least one communications interface of the data forwarding device, the one or more SR SID-to-LDP node associations for propagation to at least one other node in the SR domain, whereby the at least one other node in the SR domain will become aware of the one or more nodes in the LDP domain,
   wherein the act of transmitting the one or more SR SID-to-LDP node associations for propagation to at least one other node in the SR domain, whereby the at least one other node in the SR domain will become aware of the one or more nodes in the LDP domain, is performed using an interior gateway protocol (IGP) message carrying a type, length, value (TLV) binding, or an interior gateway protocol (IGP) message carrying a type, length, value (TLV), and
   wherein the TLV further encodes, explicitly, that the LDP node is in an LDP domain outside of the SR domain.

12. The data forwarding device of claim 11, wherein the at least one other node in the SR domain does not belong to the LDP domain, and wherein the one or more nodes in the LDP domain do not belong to the SR domain.

13. The data forwarding device of claim 11, wherein the information uniquely associated with each of one or more nodes in the LDP domain is received by the data forwarding device via an interior gateway protocol (IGP) and LDP.

14. The data forwarding device of claim 11, wherein the information uniquely associated with each of one or more nodes in the LDP domain received by the data forwarding device includes an LDP label associated with the node in the LDP domain.

15. The data forwarding device of claim 11, wherein the information uniquely associated with each of one or more nodes in the LDP domain received by the data forwarding device includes a loopback internet protocol (IP) address of the node in the LDP domain.

16. The data forwarding device of claim 15, wherein the act of associating, for each of the one or more nodes in the LDP domain, a unique SR segment identifier (SID) with the information uniquely associated with the node in the LDP domain, generates one or more SR SID-to-LDP IP loopback address bindings.

17. The data forwarding device of claim 11, wherein the TLV further encodes, explicitly, that the LDP node is in an LDP domain outside of the SR domain by setting an assigned bit in the TLV.

18. A non-transitory computer-readable storage system storing processor-executable instructions which, when executed by at least one processor of a data forwarding device belonging to both (1) a segment routing (SR) domain and (2) a label distribution protocol (LDP) domain, cause the data forwarding device to perform a method comprising:
   a) receiving, by the data forwarding device, information uniquely associated with each of one or more nodes in the LDP domain;
   b) associating, for each of the one or more nodes in the LDP domain, a unique SR segment identifier (SID) with the information uniquely associated with the node in the LDP domain, to generate one or more SR SID-to-LDP node associations; and
   c) transmitting the one or more SR SID-to-LDP node associations for propagation to at least one other node in the SR domain, whereby the at least one other node in the SR domain will become aware of the one or more nodes in the LDP domain,
   wherein the act of transmitting the one or more SR SID-to-LDP node associations for propagation to at least one other node in the SR domain, whereby the at least one other node in the SR domain will become aware of the one or more nodes in the LDP domain, is performed using an interior gateway protocol (IGP)

message carrying a type, length, value (TLV) binding, or an interior gateway protocol (IGP) message carrying a type, length, value (TLV), and wherein the TLV further encodes, explicitly, that the LDP node is in an LDP domain outside of the SR domain.

19. The non-transitory computer-readable storage system of claim 18, wherein the TLV further encodes, explicitly, that the LDP node is in an LDP domain outside of the SR domain by setting an assigned bit in the TLV.

* * * * *